United States Patent
Sawada et al.

(10) Patent No.: US 10,483,057 B2
(45) Date of Patent: Nov. 19, 2019

(54) INPUT DEVICE

(71) Applicant: Panasonic Intellectual Property Management Co., Ltd., Osaka (JP)

(72) Inventors: Masaki Sawada, Osaka (JP); Hideki Takahashi, Osaka (JP); Hiroyuki Hoshino, Kanagawa (JP); Takashi Aoki, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/186,270

(22) Filed: Nov. 9, 2018

(65) Prior Publication Data

US 2019/0080864 A1 Mar. 14, 2019

Related U.S. Application Data

(63) Continuation of application No. 15/516,221, filed as application No. PCT/JP2015/005548 on Nov. 5, 2015, now abandoned.

(30) Foreign Application Priority Data

Nov. 10, 2014 (JP) .................................. 2014-228083
Aug. 28, 2015 (JP) .................................. 2015-168415

(51) Int. Cl.
*H01H 19/14* (2006.01)
*H01H 15/06* (2006.01)
(Continued)

(52) U.S. Cl.
CPC ........... *H01H 19/14* (2013.01); *G06F 3/0362* (2013.01); *G06F 3/03547* (2013.01);
(Continued)

(58) Field of Classification Search
CPC .. G06F 3/03547; G06F 3/0362; G06F 3/0416; G06F 3/044; G06F 2203/04103;
(Continued)

(56) References Cited

U.S. PATENT DOCUMENTS 4,057,520 A 11/1977 Schwartz
5,801,346 A * 9/1998 Taniuchi ................ H01H 19/11
200/11 J
(Continued)

FOREIGN PATENT DOCUMENTS

EP 750327 A2 12/1996
JP S57-113517 A 7/1982
(Continued)

OTHER PUBLICATIONS

Communication pursuant to Article 94(3) EPC dated Sep. 5, 2018 for the related European Patent Application No. 15859633.8.
(Continued)

*Primary Examiner* — Anthony R Jimenez
(74) *Attorney, Agent, or Firm* — McDermott Will & Emery LLP

(57) ABSTRACT

An input device has a first electrode, a second electrode, and a third electrode. The second electrode opposes to the first electrode while being spaced apart therefrom. The third electrode is spaced apart from the first electrode and rotatably or slidably provided relative to the second electrode. By the third electrode being brought into contact with or spaced apart from the second electrode, an electrical state between the first electrode and the second electrode changes. Based on this electrical change, a rotary manipulation or a slide manipulation is detected.

15 Claims, 21 Drawing Sheets

(51) Int. Cl.
*H01H 19/02* (2006.01)
*H01H 89/00* (2006.01)
*G06F 3/0362* (2013.01)
*G06F 3/041* (2006.01)
*G06F 3/044* (2006.01)
*G06F 3/0354* (2013.01)
*H01H 19/08* (2006.01)
*H01H 25/00* (2006.01)

(52) U.S. Cl.
CPC ............ *G06F 3/044* (2013.01); *G06F 3/0416* (2013.01); *H01H 15/06* (2013.01); *H01H 19/02* (2013.01); *H01H 19/08* (2013.01); *H01H 89/00* (2013.01); *G06F 2203/04103* (2013.01); *H01H 25/00* (2013.01)

(58) Field of Classification Search
CPC .......... H01H 9/14; H01H 15/06; H01H 19/02; H01H 19/08; H01H 89/00; H01H 25/00
USPC ........................................................ 200/336
See application file for complete search history.

(56) References Cited

U.S. PATENT DOCUMENTS

| | | | |
|---|---|---|---|
| 5,936,613 A | 8/1999 | Jaeger et al. | |
| 5,939,973 A * | 8/1999 | Imamura | H01C 10/36 338/162 |
| 8,035,043 B2 | 10/2011 | Asada | |
| 2004/0104727 A1 | 6/2004 | Morimoto | |
| 2006/0012944 A1 | 1/2006 | Mamigonians | |
| 2009/0026051 A1 * | 1/2009 | Chou | H01H 19/11 200/11 R |
| 2010/0026532 A1 | 2/2010 | Shimizu et al. | |
| 2011/0214978 A1 * | 9/2011 | Byrne | H03K 17/975 200/600 |
| 2012/0292173 A1 | 11/2012 | Nakajima | |
| 2013/0038549 A1 * | 2/2013 | Kitada | G06F 3/0338 345/173 |

FOREIGN PATENT DOCUMENTS

| | | |
|---|---|---|
| JP | S60-117512 A | 6/1985 |
| JP | 2004-045243 A | 2/2004 |
| JP | 2007-080778 A | 3/2007 |
| JP | 2012-035782 A | 2/2012 |
| JP | 2013-041320 A | 2/2013 |
| JP | 2013-178678 A | 9/2013 |

OTHER PUBLICATIONS

Extended European Search Report dated Oct. 20, 2017 for the related European Patent Application No. 15859633.8.
International Search Report issued in Application No. PCT/JP2015/005548 dated Feb. 2, 2016, with English translation.
Final Office Action issued in related U.S. Appl. No. 15/516,221 dated Jul. 9, 2018.
Non-Final Office Action issued in related U.S. Appl. No. 15/516,221 dated Dec. 15, 2017.

* cited by examiner

INPUT DEVICE

RELATED APPLICATIONS

This application is a Continuation Application of U.S. application Ser. No. 15/516,221 filed on Mar. 31, 2017, which is the U.S. National Phase under 35 U.S.C. § 371 of International Application No. PCT/JP2015/005548, filed on Nov. 5, 2015, which in turn claims the benefit of Japanese Application No. 2014-228083, filed on Nov. 10, 2014, and Japanese Application No. 2015-168415, filed Aug. 28, 2015, the disclosures of which are incorporated by reference herein.

TECHNICAL FIELD

The present invention relates to an input device used as an input manipulation unit of various electronic devices.

BACKGROUND ART

As an input manipulation unit of various electronic devices, an input device of the rotary manipulation type is frequently employed for setting and adjusting various functions.

For example, PTL 1 discloses a conventional input device of the rotary manipulation type. The input device has a rotary manipulation knob, a variable electrode disposed at the rotary manipulation knob, and fixed electrodes disposed so as to oppose to the variable electrode. When the user rotates the rotary manipulation knob, the rotation causes the variable electrode to rotationally shift. This rotational shift causes an electrical change at the fixed electrodes. Detecting this electrical change enables to contactlessly detect the rotary manipulation of the rotary manipulation knob.

On the other hand, PTL 2 discloses other input device of the rotary manipulation type. This input device has a rotary manipulation knob (a rotary manipulator) disposed on a touch panel, and a variable electrode (a terminal) provided at the rotary manipulation knob. When the user rotates the rotary manipulation knob, the rotation causes the variable electrode to slide over the upper surface of the touch panel. The touch panel is manipulated by the sliding.

CITATION LIST

Patent Literature

PTL 1: Unexamined Japanese Patent Publication No. 2007-80778
PTL 2: Unexamined Japanese Patent Publication No. 2012-35782

SUMMARY OF THE INVENTION

The present disclosure provides an input device capable of stably detecting a rotary manipulation or a slide manipulation.

An input device of the present disclosure has a first electrode, a second electrode, and a third electrode. The second electrode opposes to the first electrode while being spaced apart therefrom. The third electrode is spaced apart from the first electrode and rotatably or slidably provided relative to the second electrode. By the third electrode being brought into contact with or spaced apart from the second electrode, an electrical state between the first electrode and the second electrode changes. Based on this electrical change, a rotary manipulation or a slide manipulation is detected.

In this structure, the third electrode is brought into contact with or spaced apart from the second electrode in accordance with a rotary manipulation or a slide manipulation. Accordingly, an electrical state between the first electrode and the second electrode changes. For example, capacitance generated between these electrodes changes always similarly in accordance with a certain rotary manipulation or slide manipulation. Therefore, the input device is capable of stably detecting a predetermined manipulation.

DESCRIPTION OF EMBODIMENTS

Prior to a description of exemplary embodiments of the present invention, a description will be briefly given of a problem associated with the conventional input device of the rotary manipulation type. In the input device of the rotary manipulation type disclosed in PTL 1, a clearance is provided between the variable electrode and the fixed electrodes. Based on detecting a change in capacitance between the variable electrode and the fixed electrodes, a rotary manipulation is detected.

However, in this structure, variations in the clearance between the variable electrode and the fixed electrodes may result in variations in capacitance. Accordingly, it is difficult to stably detect a rotary manipulation.

In the following, a description will be given of input devices according to various exemplary embodiments of the present invention with reference to the drawings.

First Exemplary Embodiment

Figure 1:
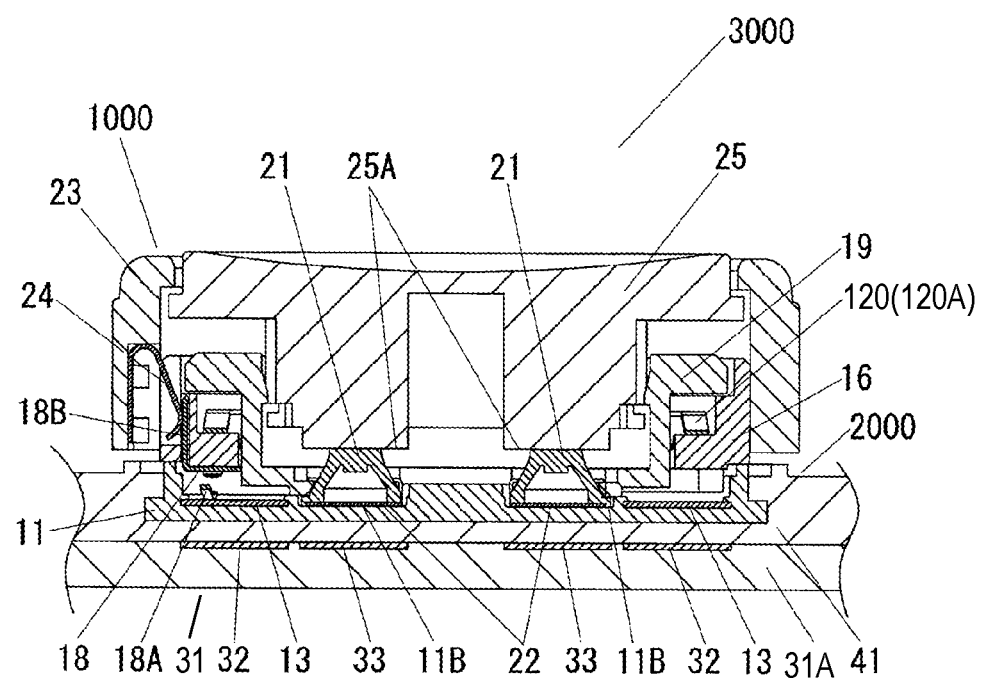
FIG. 1 is a cross-sectional view of an input device according to a first exemplary embodiment of the present invention.
Figure 2:
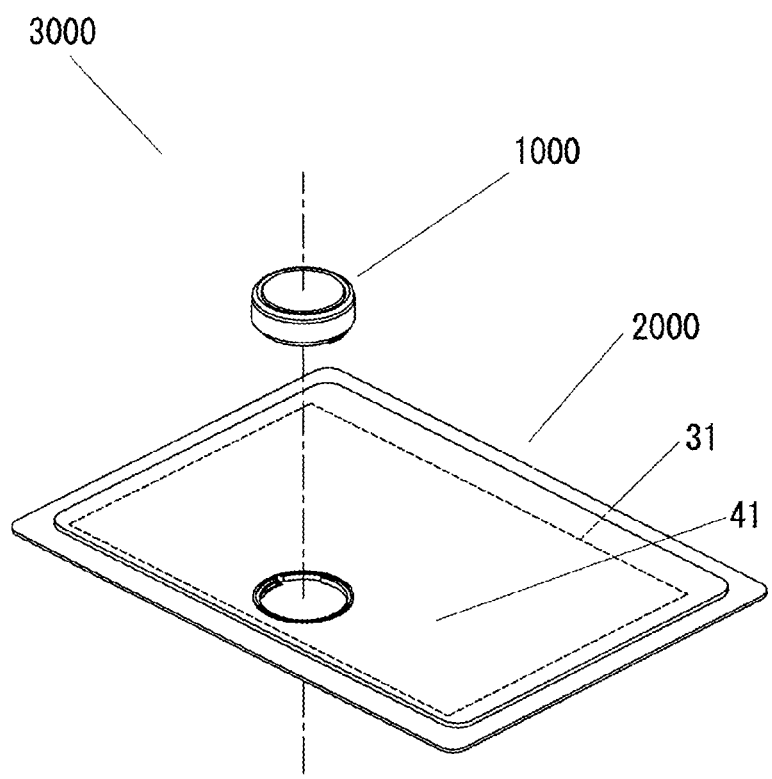
FIG. 2 is an exploded perspective view of the input device shown in FIG. 1.
Figure 3:
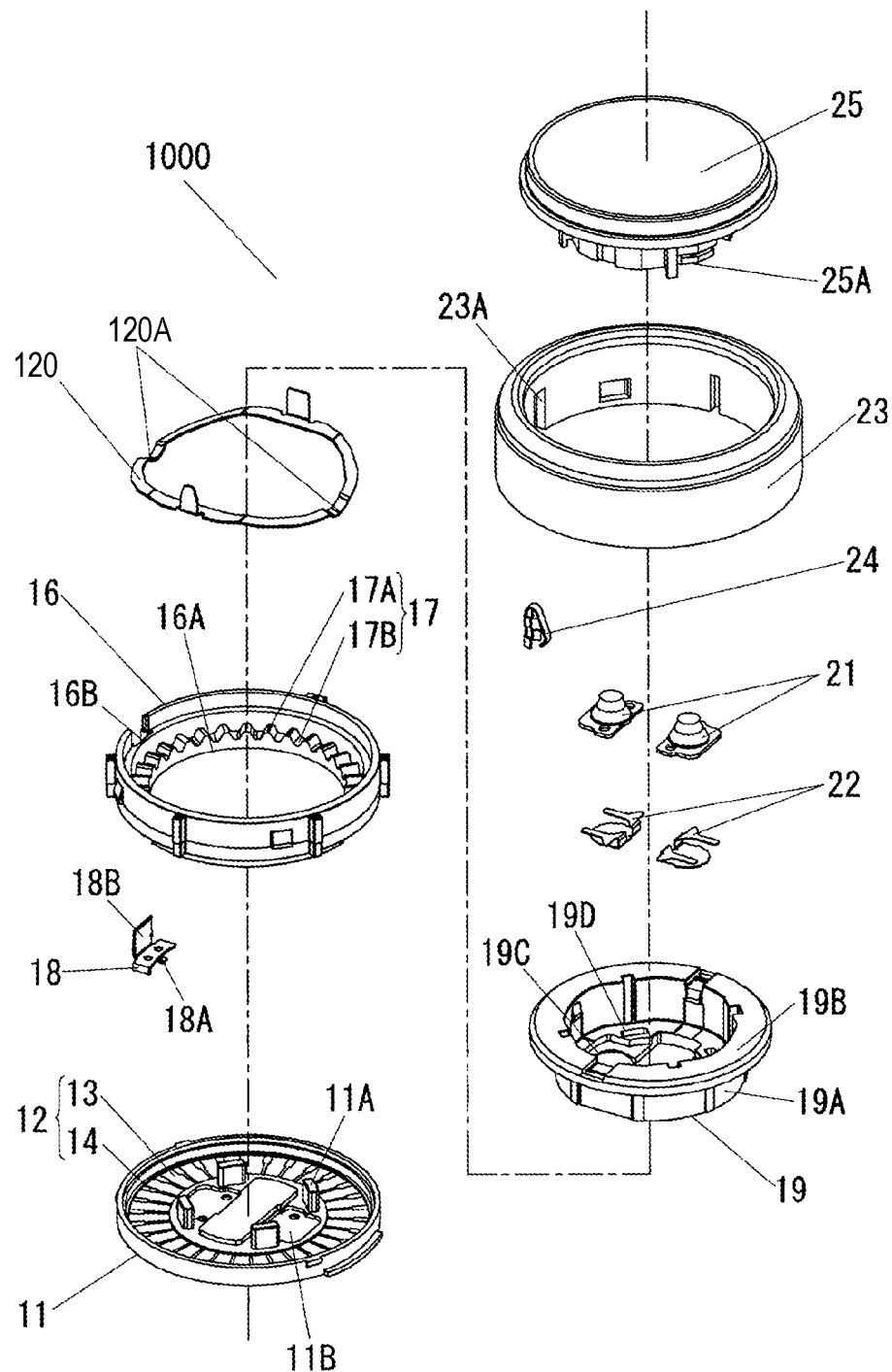
FIG. 3 is an exploded perspective view of a rotary manipulation unit of the input device shown in FIG. 1.

FIG. 1 is a cross-sectional view of input device 3000 of the rotary manipulation type according to a first exemplary embodiment of the present invention. FIG. 2 is an exploded perspective view of input device 3000. FIG. 3 is an exploded perspective view of rotary manipulation unit 1000 of input device 3000.

As shown in FIGS. 1 and 2, input device 3000 has rotary manipulation unit 1000, and touch panel unit 2000 equipped with rotary manipulation unit 1000. Touch panel unit 2000 includes touch panel 31, and cover panel 41 which is made of transparent resin and stacked on the upper surface of touch panel 31. Rotary manipulation unit 1000 includes lower casing 11, and the lower surface of lower casing 11 is fitted into cover panel 41.

In rotary manipulation unit 1000, variable electrode 18 rotates in accordance with a rotary manipulation of rotary manipulation knob 23, and brought into contact with or spaced apart from fixed electrodes 13. By variable electrode 18 and fixed electrodes 13 being brought into contact with or spaced apart from each other, an electrical state between fixed electrodes 13 and sensor electrodes 32 of touch panel unit 2000 changes. With input device 3000, based on detecting a change in capacitance generated between fixed electrodes 13 and sensor electrodes 32, a rotary manipulation of rotary manipulation unit 1000 can be detected.

As described above, input device 3000 has sensor electrodes 32 being the first electrode, fixed electrodes 13 being the second electrode, and variable electrode 18 being the third electrode. Fixed electrodes 13 oppose to sensor electrodes 32 while being spaced apart therefrom. Variable electrode 18 is spaced apart from sensor electrodes 32, and rotatably provided relative to fixed electrodes 13. By variable electrode 18 being brought into contact with or spaced apart from fixed electrode 13, an electrical state between sensor electrodes 32 and fixed electrodes 13 changes. Based on this electrical change, a rotary manipulation can be detected.

Figure 4:
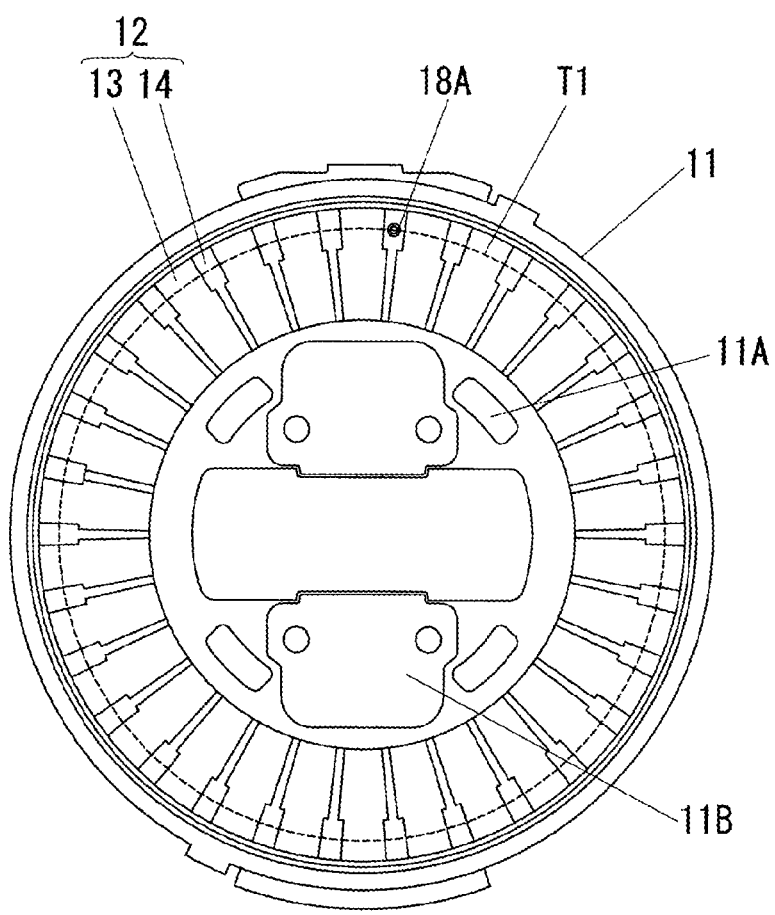
FIG. 4 is a top view of a lower casing of the input device shown in FIG. 1.

In the following, a detailed description will be given of the structure of each element. Firstly, with reference to FIGS. 1, 3, and 4, a description will be given of rotary manipulation unit 1000. FIG. 4 is a top view of lower casing 11. Rotary manipulation unit 1000 has lower casing 11, holder 19, click spring 120, elastic bodies 21, connecting electrodes 22, rotary body 16, variable electrode 18, rotary manipulation knob 23, first connecting terminal 24, and pressing body 25.

As shown in FIG. 3, lower casing 11 made of insulating resin is provided with a concavity which opens upward. As shown in FIG. 4, lower casing 11 is circular as seen in a top view. At the upper surface of the concavity, groove 12 which is annular as seen in a top view is provided. Further, on the position inner than groove 12, four pillars 11A extending upward and two recesses 11B are formed.

The inner bottom surface of groove 12 is formed to be flat. At the inner bottom surface of groove 12, a plurality of fixed electrodes 13 are exposed, which fixed electrodes 13 are each made of a thin metal plate and insert-molded into lower casing 11. The plurality of fixed electrodes 13 are radially disposed at the inner bottom surface of groove 12. The adjacent fixed electrodes 13 are electrically insulated from each other by resin surface 14 interposed between them. Note that, in each fixed electrode 13, the portion on the outer circumference side of groove 12 has its both sides cut away. Accordingly, in each resin surface 14, the portion positioned on the outer circumference side of groove 12 is greater than in width than the portion positioned on the inner circumference side of groove 12.

As shown in FIG. 3, holder 19 made of insulating resin is circularly formed as seen in a top view. Holder 19 has bottomed cylinder 19A and flange 19B which annularly projects in the outer diameter direction from the top of cylinder 19A. At the lower surface of flange 19B, click spring 120 which is made of elastic metal and annular as seen in a top view is swaged. Click spring 120 is provided with projections 120 which project downwardly in an arc-shaped manner.

At the bottom surface of holder 19, swage holes 19D are provided. By pillars 11A of lower casing 11 being respectively inserted into swage holes 19D and having their tips swaged, holder 19 is fixed to lower casing 11.

At the bottom surface of holder 19, cross-shaped penetrating button mounting portion 19C is formed. Each elastic body 21 made of rubber has a shape of a truncated cone whose bottom side is open. Each connecting electrode 22 is bent to be U-shaped. Connecting electrodes 22 and elastic bodies 21 have their respective lower surfaces housed in recesses 11B of lower casing 11, respectively. Elastic bodies 21 and connecting electrodes 22 form a push button in button mounting portion 19C.

Rotary body 16 made of insulating resin is provided with central hole 16A, and formed to be annular as seen in a top view. Cylinder 19A of holder 19 is inserted into central hole 16A. Accordingly, rotary body 16 is rotatably fixed relative to holder 19.

Over the entire inner circumference of rotary body 16, concavity-convexity portion 17 having concavities and convexities on the upper side is provided. In concavity-convexity portion 17, convexities 17A projecting upward and concavities 17B recessed downward are alternately formed. By projections 120A of click spring 120 being elastically brought into contact with the upper surface of concavity-convexity portion 17, a click step is obtained corresponding to a predetermined rotation angle when rotary body 16 is rotated. That is, concavity-convexity portion 17 and click spring 120 structure a clicking mechanism which provides a click step corresponding to a predetermined rotation angle of rotary manipulation knob 23 being rotationally manipulated.

Variable electrode 18 is formed by a thin elastic metal plate which is bent to be L-shaped. One side of the L shape forms contact 18A, and the other side structures fixing portion 18B which projects upward in a predetermined width. By fixing portion 18B being press-fitted into insert portion 16B provided at rotary body 16, variable electrode 18 is fixed to the lower surface of the outer circumferential portion of rotary body 16. On the other hand, contact 18A of variable electrode 18 is elastically in contact with the inner bottom surface of groove 12 of lower casing 11 at a predetermined position.

Note that, the sign "double circle" in FIG. 4 schematically represents the disposition position of contact 18A of variable electrode 18. Contact 18A is in contact with the inner bottom surface of groove 12 at the position of the sign "double circle". Contact 18A slides on concentric track T1 in accordance with the rotational movement of rotary body 16.

That is, variable electrode 18 is brought into contact with or spaced apart from fixed electrodes 13 on track T1 by the rotational movement of rotary body 16. Accordingly, depending on the rotation angle position of rotary body 16, variable electrode 18 is in contact with none of fixed electrodes 13 or one of fixed electrodes 13.

As described above, rotary body 16 is provided with concavity-convexity portion 17, and projections 120A of click spring 120 are elastically in contact with the upper surface of concavity-convexity portion 17. In the state where variable electrode 18 is in contact with none of fixed electrodes 13, projections 120A of click spring 120 are positioned at concavities 17B of concavity-convexity portion 17.

On the other hand, in the state where variable electrode 18 is in contact with one of fixed electrodes 13, projections 120A are positioned at convexities 17A of concavity-convexity portion 17.

That is, in rotary manipulation unit 1000, in the non-manipulation state where a predetermined rotational torque is not applied to rotary body 16, projections 120A are positioned at concavities 17B, and the rotation angle position of rotary body 16 is stable. Then, in synchronization with the click step with the rotational movement of rotary body 16, contact 18A and fixed electrodes 13 are brought into contact with or spaced apart from each other.

Rotary manipulation knob 23 which is annular as seen in a top view is fitted to rotary body 16 while covering the outer circumference of rotary body 16, and fixed so as to rotate together with rotary body 16. Rotary manipulation knob 23 is made of metal, and insert groove 23A is provided at the sidewall on the inner circumference side. First connecting terminal 24 made of a thin metal plate is bent to be U-shaped, and is springy. First connecting terminal 24 is fixed by being press-fitted into insert groove 23A. First connecting terminal 24 is elastically in contact with fixing portion 18B of variable electrode 18, and electrically connects between variable electrode 18 and rotary manipulation knob 23.

Rotary manipulation knob 23 is formed by metal such as aluminum, for example. Note that, the portion touched by the user's finger which will be described later, that is, the outer circumferential portion of rotary manipulation knob 23 may be decorated by anodizing the aluminum or the like. Further, at the outer circumferential portion of rotary manipulation knob 23, an insulating body such as insulating resin may be formed film-like. That is, the outer circumferential portion of rotary manipulation knob 23 may be covered with an insulating body having a thickness of about 5 µm to 50 µm.

Pressing body 25 made of metal is circular as seen in a top view. The lower portion of pressing body 25 is vertically movably fixed inside holder 19. The upper surface of pressing body 25 is bowl-shaped, being curved and slightly recessed, and provided with a not-shown design. Pressing body 25 has pressing portions 25A which project downward. Pressing portions 25A have their respective lower surfaces abutted on the upper surfaces of elastic bodies 21, respectively.

Pressing body 25 is formed by metal such as aluminum. Note that, the portion touched by the user's finger which will be described later, that is, the upper surface of pressing body 25 may be decorated by anodizing the aluminum or the like. Further, at the upper surface of pressing body 25, an insulating body such as insulating resin or the like may be formed film-like. That is, the upper surface of pressing body 25 may be covered with an insulating body having a thickness of about 5 µm to 50 µm.

Rotary manipulation unit 1000 is structured in the above-described manner. Fixed electrodes 13 of rotary manipulation unit 1000 oppose to the upper surface of touch panel 31 of touch panel unit 2000.

Figure 5:
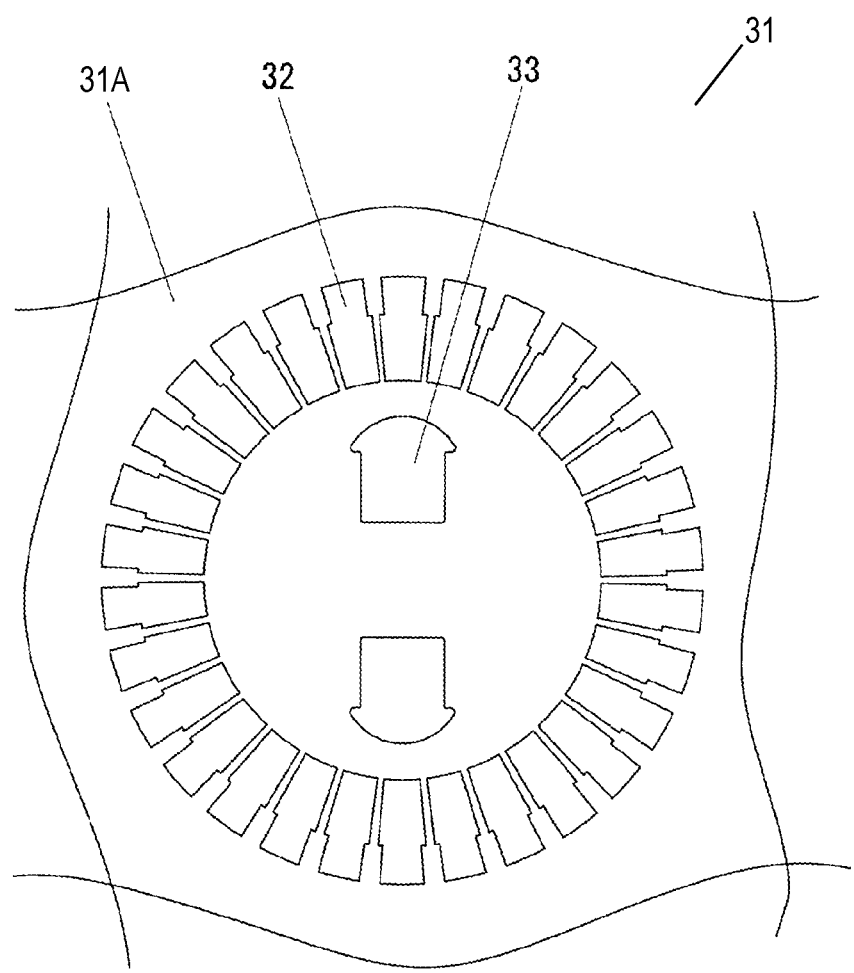
FIG. 5 is a top view showing the disposition pattern of sensor electrodes of a touch panel of the input device shown in FIG. 1.

Next, with reference to FIGS. 1 and 5, a description will be given of touch panel unit 2000. FIG. 5 is a top view showing the disposition pattern of sensor electrodes 32 of touch panel 31. As described above, touch panel unit 2000 includes touch panel 31, and cover panel 41 which is made of transparent resin and stacked on the upper surface of touch panel 31.

As shown in FIGS. 1 and 5, touch panel 31 has first base member 31A which is film-like and made of light-transmissive insulating resin, and a plurality of sensor electrodes 32, 33 which are formed to be transparent by indium tin oxide (ITO) or the like at the upper surface of first base member 31A. Sensor electrodes 32, 33 are each formed into a predetermined pattern. Touch panel 31 detects a change in capacitance formed between an electrically conductive body in contact with or in close proximity to its upper surface and sensor electrodes 32, 33, thereby detecting the plane position of the electrically conductive body. That is, touch panel 31 is of the capacitance scheme. Note that, sensor electrodes 32, 33 are not necessarily transparent, and may each be a thin metal film formed through vapor deposition or the like.

As shown in FIG. 5, in touch panel 31, a plurality of sensor electrodes 32, 33 are formed at the position where rotary manipulation unit 1000 is mounted. Each sensor electrode 32 is formed to have a shape substantially identical to that of fixed electrode 13 as seen in a top view. Sensor electrodes 32 are each formed at the position opposing to one of fixed electrodes 13. Each sensor electrode 33 is formed to have a shape substantial to that of the lower surface of connecting electrode 22 as seen in a top view. Sensor electrodes 33 are each formed at the position opposing to the lower surface of one of connecting electrodes 22. Note that, to sensor electrodes 32, 33, not-shown leads are respectively connected, so that sensor electrodes 32, 33 are connected to a not-shown predetermined electronic circuit. Sensor electrodes 32, 33 may be respectively structured by at least one transmitter electrode and at least one receiver electrode.

While not shown in the drawings, touch panel 31 is provided also with a grid-like sensor electrode (transparent electrode) at a place other than the plane position where rotary manipulation unit 1000 is mounted. Thus, touch panel 31 accepts a touch manipulation with the user's finger or the like.

Further, with input device 3000, while it is desirable to use touch panel 31 in which sensor electrodes 32, 33 are arranged in the above-described disposition pattern, it is also possible to use a touch panel of a general disposition pattern in which a grid-like sensor electrode (transparent electrode) is formed over the entire surface of the touch panel.

Note that, touch panel 31 is just required to be capable of detecting a change in capacitance formed between an electrically conductive body in contact with or in close proximity to its upper surface and the sensor electrodes. That is, so long as touch panel 31 is of the capacitance scheme, touch panel 31 may be surface capacitive or projected capacitive. Further, touch panel 31 may be of the self capacitance type or the mutual capacitance type.

Note that, when touch panel 31 is of the mutual capacitance type, one sensor electrode is formed by a pair of the transmitter electrode and the receiver electrode, and the sensor electrode detects a change in capacitance. That is, sensor electrodes 32, 33 may be structured by at least one transmitter electrode and at least one receiver electrode.

Figure 6:
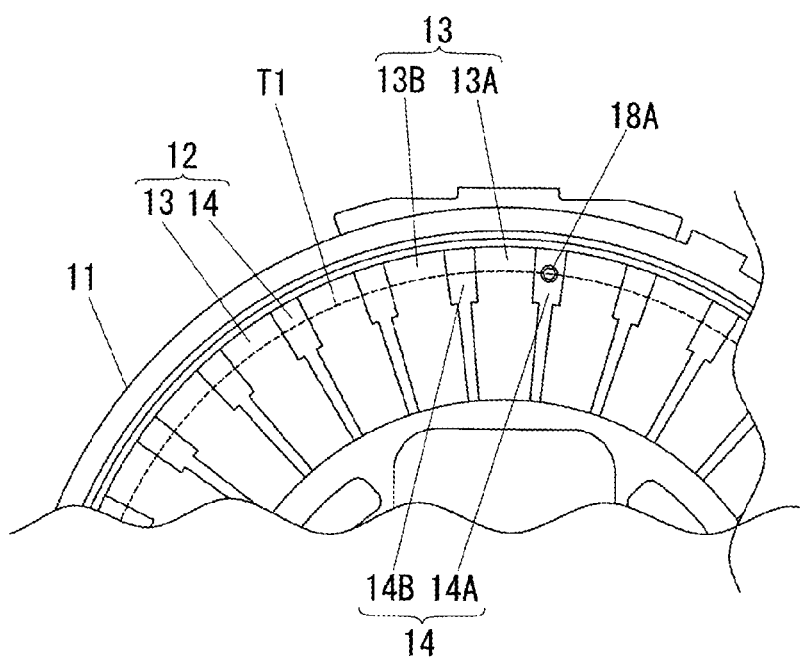
FIG. 6 is an enlarged view of a main part showing the relationship between the lower casing and a contact of the input device shown in FIG. 1.
Figure 7A:
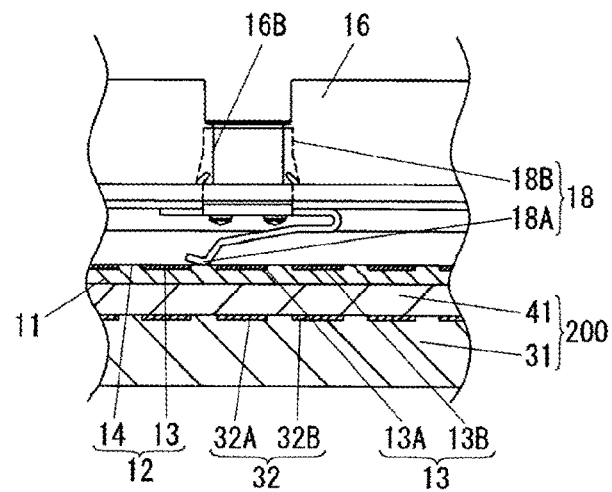
FIG. 7A is a diagram showing a variable electrode and fixed electrodes of the input device shown in FIG. 1 being brought into contact with or spaced apart from each other.
Figure 7B:
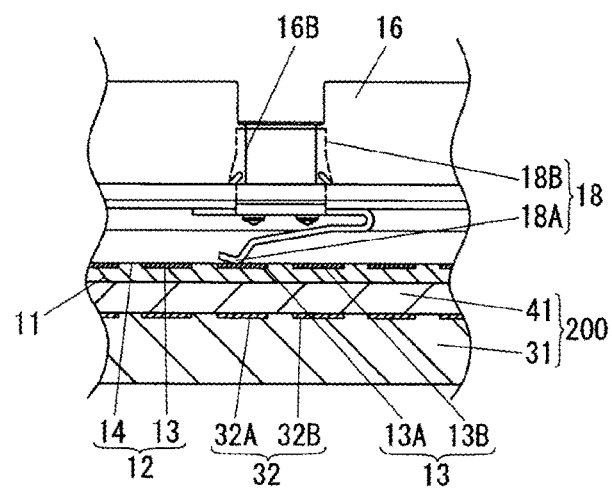
FIG. 7B is a diagram showing the variable electrode and the fixed electrodes of the input device shown in FIG. 1 being brought into contact with or spaced apart from each other.
Figure 7C:
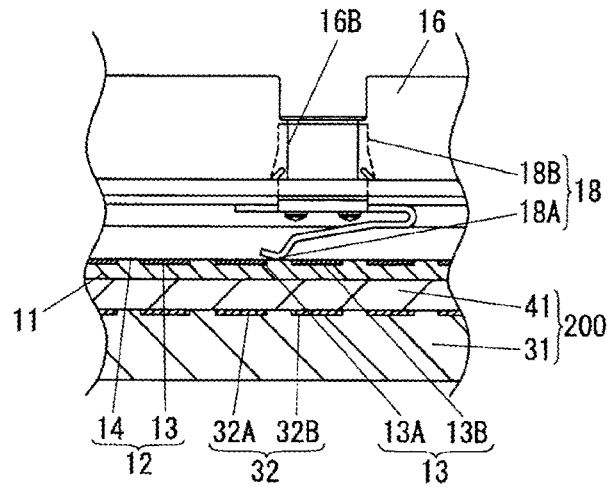
FIG. 7C is a diagram showing the variable electrode and the fixed electrodes of the input device shown in FIG. 1 being brought into contact with or spaced apart from each other.
Figure 8A:
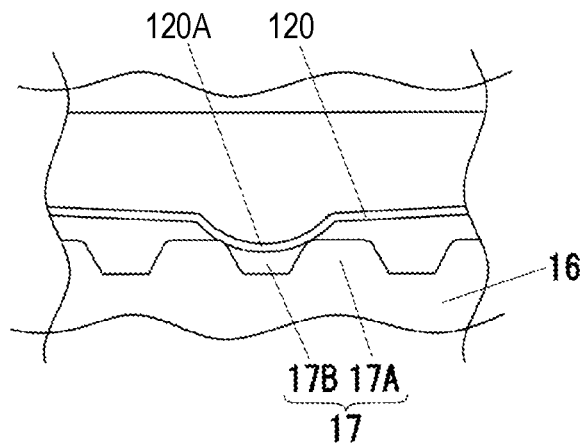
FIG. 8A is a diagram showing the positional relationship between a projection of a click spring and a concavity-convexity portion of a rotary body in FIG. 7A.
Figure 8B:
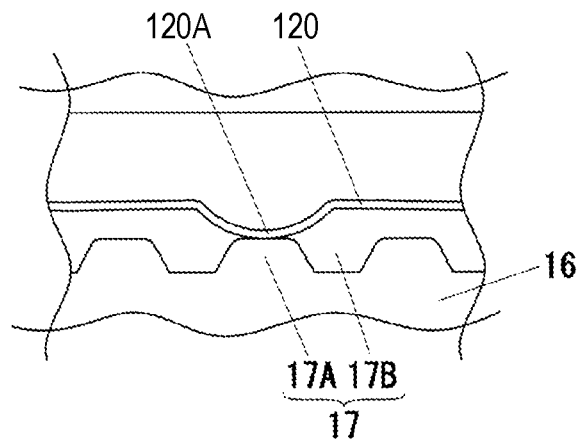
FIG. 8B is a diagram showing the positional relationship between the projection of the click spring and the concavity-convexity portion of the rotary body in FIG. 7B.
Figure 8C:
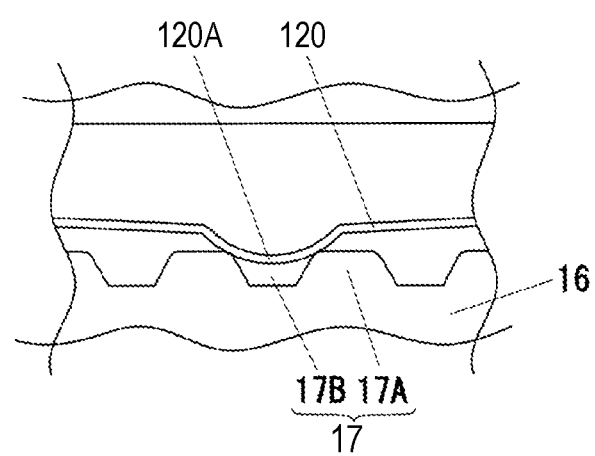
FIG. 8C is a diagram showing the positional relationship between the projection of the click spring and the concavity-convexity portion of the rotary body in FIG. 7C.

Next, with reference to FIGS. 6 to 8C, a description will be given of an operation of input device 3000 by a rotary manipulation. FIG. 6 is an enlarged view of the main part showing the relationship between lower casing 11 and contact 18A of variable electrode 18. FIGS. 7A to 7C are diagrams showing variable electrode 18 and fixed electrodes 13 being brought into contact with or spaced apart from each other. FIGS. 8A to 8C are diagrams showing the positional relationship between projection 120A of click spring 120 and concavity-convexity portion 17 of rotary body 16 in FIGS. 7A to 7C.

Note that, in order to describe the operation of input device 3000, part of fixed electrodes 13 in FIG. 6 are shown as fixed electrodes 13A, 13B, and part of resin surfaces 14 are shown as resin surfaces 14A, 14B. Similarly, part of fixed electrodes 13 in FIGS. 7A to 7C are shown as fixed electrodes 13A, 13B, and sensor electrodes 32 opposing to fixed electrodes 13A, 13B are shown as sensor electrodes 32A, 32B.

Note that, similarly to FIG. 4, the sign "double circle" shown in FIG. 6 schematically shows the disposition position of contact 18A of variable electrode 18. Contact 18A is in contact with the inner bottom surface of groove 12 at the position of the sign "double circle". Contact 18A slides on concentric track T1 in accordance with the rotational movement of rotary body 16.

As shown in FIG. 8A, in the non-manipulation state, projection 120A of click spring 120 is positioned at concavity 17B of rotary body 16, and therefore the rotation angle position of rotary manipulation knob 23 is stable. In this state, as shown in FIGS. 6 and 7A, contact 18A is in contact with resin surface 14 (resin surface 14A). That is, variable electrode 18 is in contact with none of fixed electrodes 13.

Next, when the user touches rotary manipulation knob 23 with his/her finger or the like, the user's finger is electrically connected to variable electrode 18 via rotary manipulation knob 23 and first connecting terminal 24. From this state, when the user rotationally manipulates rotary manipulation knob 23, rotary body 16 coupled to rotary manipulation knob 23 rotates together. Then, contact 18A shifts on groove 12 along track T1, and as shown in FIG. 7B, contact 18A and fixed electrode 13 (fixed electrode 13A) are brought into contact with each other. While the shifting, the electrical connection between the user's finger and variable electrode 18 is maintained.

As a result, fixed electrode 13A is electrically connected to the user's finger via variable electrode 18, whereby capacitance generated between fixed electrode 13A and sensor electrode 32A changes. Then, by a not-shown electronic circuit detecting the change in capacitance, the position of variable electrode 18 is detected.

In the state where variable electrode 18 and fixed electrode 13A are in contact with each other, as shown in FIG. 8B, projection 120A of click spring 120 is positioned at convexity 17A of concavity-convexity portion 17 of rotary body 16. That is, the rotation angle position of rotary manipulation knob 23 is not regulated.

Then, when the user further rotationally manipulates rotary manipulation knob 23 from the state shown in FIG. 7B, contact 18A further shifts on groove 12 along track T1 with clicking touch. Thus, as shown in FIG. 7C, variable electrode 18 and resin surface 14 (resin surface 14B) are in contact with each other. That is, again, variable electrode 18 is in contact with none of fixed electrodes 13.

Note that, as shown in FIG. 7C, in the state where variable electrode 18 is in contact with none of fixed electrodes 13, as shown in FIG. 8C, projection 120A of click spring 120 is stable being positioned at concavity 17B of rotary body 16.

Then, when the user further rotationally manipulates rotary manipulation knob 23 from the state FIG. 7C, variable electrode 18 is brought into contact with fixed electrode 13B shown in FIG. 6. Then, capacitance generated between fixed electrode 13B and sensor electrode 32B changes. By the not-shown electronic circuit detecting the change, the position of variable electrode 18 is detected.

A series of operations having been described above enables to detect that the position of variable electrode 18 has shifted from the upper surface of fixed electrode 13A to the upper surface of fixed electrode 13B.

As described above, the user's rotationally manipulating rotary manipulation knob 23 causes contact 18A of variable electrode 18 to slide on track T1. In accordance with the rotation angle position, contact 18A and fixed electrode 13 (fixed electrodes 13A, 13B) are brought into contact with each other. Then, capacitance between fixed electrode 13 to which contact 18A is connected and sensor electrode 32 changes. By the not-shown electronic circuit detecting the change in capacitance, the position of variable electrode 18 is detected.

That is, touch panel 31 detects the shift of variable electrode 18 caused by a rotary manipulation, and a rotary manipulation in accordance with its rotating direction or rotary shift amount is performed.

In this structure, since fixed electrodes 13 do not shift relative to sensor electrodes 32, variations in the clearance between sensor electrodes 32 and fixed electrodes 13 are suppressed. Thus, capacitance generated between the electrodes changes always similarly in accordance with a certain rotary manipulation.

Note that, in the example shown in FIGS. 7A to 7C, while one fixed electrode 13 (13A) opposes to one sensor electrode 32 (32A) in a one-to-one relationship, the present invention is not limited thereto. For example, one fixed electrode 13

(13A) may oppose to two adjacent sensor electrodes 32 (32A, 32B) so as to straddle sensor electrodes 32 (32A, 32B). In this case, a not-shown electronic circuit detects a change in capacitance generated between fixed electrode 13 (13A) and one sensor electrode 32 (32A) and a change in capacitance generated between fixed electrode 13 (13A) and other sensor electrode 32 (32B). The electronic circuit performs processing of comparing the changes in capacitance, that is, signal weighting processing or the like, and detects the position of fixed electrode 13 to which contact 18A is connected.

Note that, alternative to the user's finger and variable electrode 18 being electrically connected to each other in terms of direct-current components, they may be electrically connected to each other in terms of alternating-current components. That is, even when the outer circumferential portion of rotary manipulation knob 23 is covered with a film-like insulating body by anodizing of aluminum or insulating resin, a rotary manipulation can be detected in the above-described manner by the user's finger and rotary manipulation knob 23 being electrically connected to each other with full capacitive coupling via the insulating body.

Further, it is just required that the user's finger and variable electrode 18 are electrically connected to each other via rotary manipulation knob 23. Therefore, for example, rotary manipulation knob 23 may be structured by a resin molded body, and an electrically conductive portion formed by electroplating at a predetermined surface position of the resin molded body. Further, rotary manipulation knob 23 may be formed by insert molding of a thin metal plate as processed to have a predetermined shape. In this case, rotary manipulation knob 23 should be structured such that the user's finger and variable electrode 18 can electrically connect to each other via the thin metal plate.

Further, with input device 3000, in the non-manipulation state where no rotary manipulation is performed, variable electrode 18 is not in contact with fixed electrodes 13. Accordingly, touch panel 31 can easily detect the position of variable electrode 18. That is, a rotary manipulation is stably detected. In the following, the reason thereof and others are described in detail.

In general, with a touch panel of the capacitance scheme, the absolute value of capacitance changes over time due to variations in temperature or the like, even in the non-manipulation state. Accordingly, with a touch panel device of the capacitance scheme, a reference value that changes in accordance with variations in capacitance over time is set. Thus, performing calibration and determining the amount of change in capacitance from the predetermined reference value reduces the influence of variations in capacitance over time.

The reference value is determined by an electronic circuit or the like mounted on the touch panel device, and preferably updated constantly in order to reduce the influence of temperature variations.

Such a reference value is set based on, for example, the absolute value of capacitance which is measured when the power supply of the touch panel device is turned ON. After the power supply is turned ON, the reference value is set based on the absolute value of capacitance which is measured every predetermined time in the state where any manipulator such as the user's finger or an electrically conductive body is not in contact with or in close proximity to the upper surface of the touch panel. Then, the reference value is stored in memory inside the electronic circuit, and updated from an old reference value to a new reference value.

Note that, measures are taken for errors. For example, in the case where the absolute value of the measured capacitance deviates from a predetermined set range, the measurement result is determined as abnormal value and such value is not employed as the reference value.

When capacitance is measured for calibration in the state where, after the power supply is turned ON, a manipulator such as the user's finger or any foreign object such as an electrically conductive body is in contact with or in close proximity to the upper surface of the touch panel, the capacitance value may largely deviate from the normal value because of the foreign object being in contact or in close proximity. In this case, the measured capacitance value deviates from the predetermined set range. Accordingly, control is exerted such that the measured capacitance value is not set as the reference value, and calibration is correctly performed by again performing measurement, for example.

However, a touch panel device of the general capacitance scheme is designed on the premise that, in the non-manipulation state, any conductive manipulator such as the user's finger or other foreign object is not in close proximity to the upper surface of the touch panel. Accordingly, with a touch panel device of the general capacitance scheme, when the power supply is switched from OFF to ON in the state where a manipulator such as the user's finger or a foreign object such as an electrically conductive body is in contact with or in close proximity to the upper surface of the touch panel, the absolute value of capacitance influenced by the manipulator such as the user's finger or the foreign object such as an electrically conductive body is disadvantageously set as the reference value.

On the other hand, with input device 3000, rotary manipulation unit 1000 is always placed on the upper surface of touch panel unit 2000. Accordingly, despite the above-described setting of the reference value being performed in the state where rotary manipulation unit 1000 is always in close proximity to the upper surface of touch panel 31, calibration of touch panel 31 must be correctly performed with reduced electrical influence of rotary manipulation unit 1000.

In order to cope with such a problem, input device 3000 is structured such that variable electrode 18 is in contact with none of fixed electrodes 13 in the non-manipulation state. This is described in detail in the following.

For the sake of convenience, it is assumed that variable electrode 18 is in contact with fixed electrode 13A in the non-manipulation state. In this case, capacitance between fixed electrode 13A and sensor electrode 32A, which is influenced by variable electrode 18 and rotary manipulation knob 23, is greater than capacitance between other fixed electrodes 13 with which variable electrode 18 is not in contact and sensor electrodes 32 opposing to such fixed electrodes 13.

When calibration is performed in this state, as to the set reference value, just the reference value of sensor electrode 32A becomes higher than the reference value of other sensor electrodes 32. That is, the sensitivity of sensor electrode 32A becomes lower than the sensitivity of other sensor electrodes 32. Thus, sensitivity becomes non-uniform, and stable detection of a rotary manipulation becomes difficult.

However, input device 3000 is structured such that variable electrode 18 is not in contact with none of fixed electrodes 13 in the non-manipulation state. Accordingly, under the uniform condition, that is, none of fixed electrodes 13 are in contact with variable electrode 18, calibration can be performed with all sensor electrodes 32 opposing to fixed electrodes 13. That is, calibration can be performed in the state where variable electrode 18 and rotary manipulation knob 23 are not prone to electrically influence sensor electrodes 32. Accordingly, without reducing the sensitivity of sensor electrodes 32 and while reducing variations in sensitivity, a rotary manipulation can be stably detected.

Next, a description will be given of an operation of input device 3000 by a press manipulation. When the user presses downward the upper surface of pressing body 25 with his/her finger or the like, elastic bodies 21 buckling deform with steps, and pressing portions 25A of pressing body 25 are brought into contact with the upper surface of connecting electrodes 22. Here, the user's finger and connecting electrodes 22 are electrically connected to each other via pressing body 25. This increases capacitance between connecting electrodes 22 and sensor electrodes 33. By a not-shown electronic circuit detecting the change in capacitance, the press manipulation is detected. Note that, when the press manipulation is cancelled, the contact between pressing portions 25A and connecting electrodes 22 is cancelled and elastic bodies 21 recover the original shape.

Note that, in the above-described press manipulation, alternative to the user's finger and connecting electrodes 22 being electrically connected to each other in terms of direct-current components, they may be electrically connected to each other in terms of alternating-current components. That is, even when the upper surface of pressing body 25 is covered with a film-like insulating body by anodizing of aluminum or insulating resin, a press manipulation can be detected in the above-described manner by the user's finger and pressing body 25 being electrically connected to each other with full capacitive coupling via the insulating body.

Further, it is just required that the user's finger and connecting electrodes 22 are electrically connected to each other via pressing body 25. Therefore, for example, pressing body 25 may be structured by a resin molded body, and an electrically conductive portion formed by electroplating at the predetermined surface position of the resin molded body. Further, pressing body 25 may be formed by insert molding of a thin metal plate processed to have a predetermined shape. In this case, pressing body 25 should be structured such that the user's finger and connecting electrodes 22 can electrically connect to each other via the thin metal plate.

Note that, lower casing 11 may be formed by a light-transmissive resin material such as polycarbonate, and fixed electrodes 13 may be formed with transparent electrodes such as ITO. In this case, lower casing 11 is a second base member which is light-transmissive and retains fixed electrodes 13. Then, when holder 19, rotary body 16, rotary manipulation knob 23, and pressing body 25 are made of a light-transmissive resin material such as polycarbonate, the entire rotary manipulation unit 1000 can be illuminated by light emitted from beneath lower casing 11.

Note that, in the foregoing description, a rotary manipulation is detected using capacitance generated between fixed electrodes 13 and sensor electrodes 32. However, an electrical change may be detected by other structure. For example, a rotary manipulation may be detected by detecting a change in impedance such as inductance generated by the user's finger touching rotary manipulation knob 23. The same holds true for detection of a press manipulation. That is, an electrical change occurring between connecting electrodes 22 and sensor electrodes 33 should be detected, and the method therefor is not limited to detection of a change in capacitance. The same holds true for second to fourth exemplary embodiments which will be described later.

Note that, input device 3000 has rotary manipulation unit 1000 disposed on touch panel 31, sensor electrodes 32 forming pairs with fixed electrodes 13, and sensor electrodes 33 forming pairs with connecting electrodes 22. However, in structuring the input device, it is not essential for rotary manipulation unit 1000 to be disposed on touch panel 31. Further, it is not essential for sensor electrodes to be transparent.

That is, the input device may be structured by disposing rotary manipulation unit 1000 on a wiring substrate such as a printed circuit board which has a plurality of fixed electrodes being exposed in a predetermined pattern on a plate-like base member made of epoxy resin or the like.

Second Exemplary Embodiment

In the first exemplary embodiment, a description has been given of input device 3000 of the absolute scheme in which a rotation angle position of variable electrode 18 is detected by sensor electrodes 33. In the following, a description will be given of input device 3001 of the increment scheme according to a second exemplary embodiment of the present invention and the structure of electrodes of rotary manipulation unit 1001 used therefor.

Figure 9:
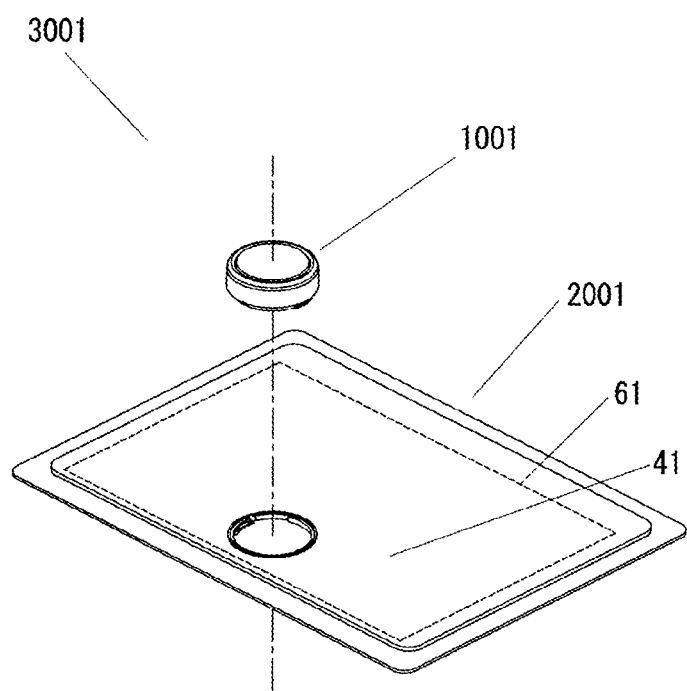
FIG. 9 is an exploded perspective view of an input device according to a second exemplary embodiment of the present invention.

FIG. 9 is an exploded perspective view of input device 3001. Input device 3001 has rotary manipulation unit 1001, and touch panel unit 2001 equipped with rotary manipulation unit 1001. Note that, structures identical to those in the first exemplary embodiment are denoted by identical reference characters, and a description will be mainly given of the difference from the first exemplary embodiment.

Figure 10:
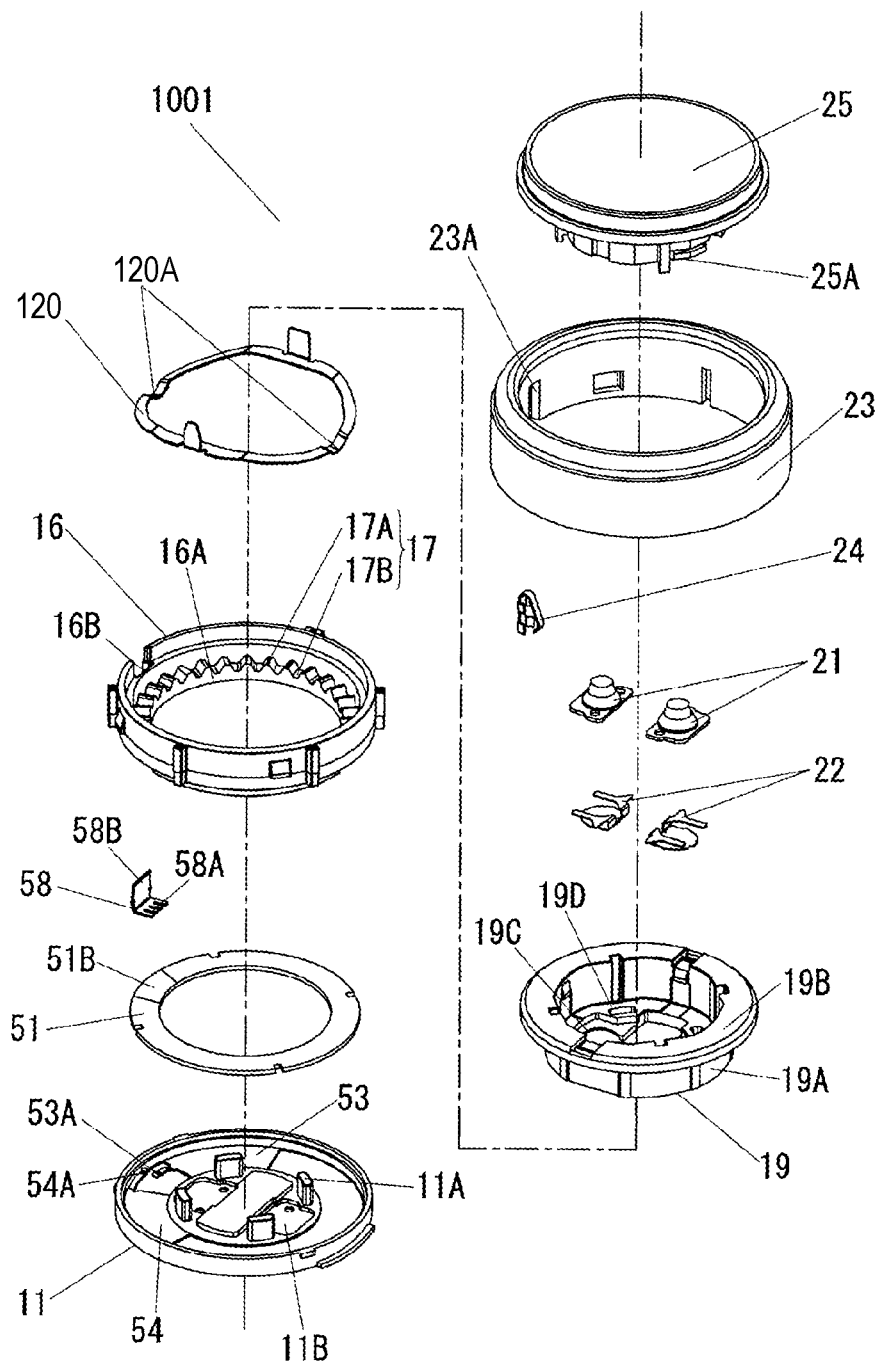
FIG. 10 is an exploded perspective view of a rotary manipulation unit of the input device shown in FIG. 9.
Figure 11:
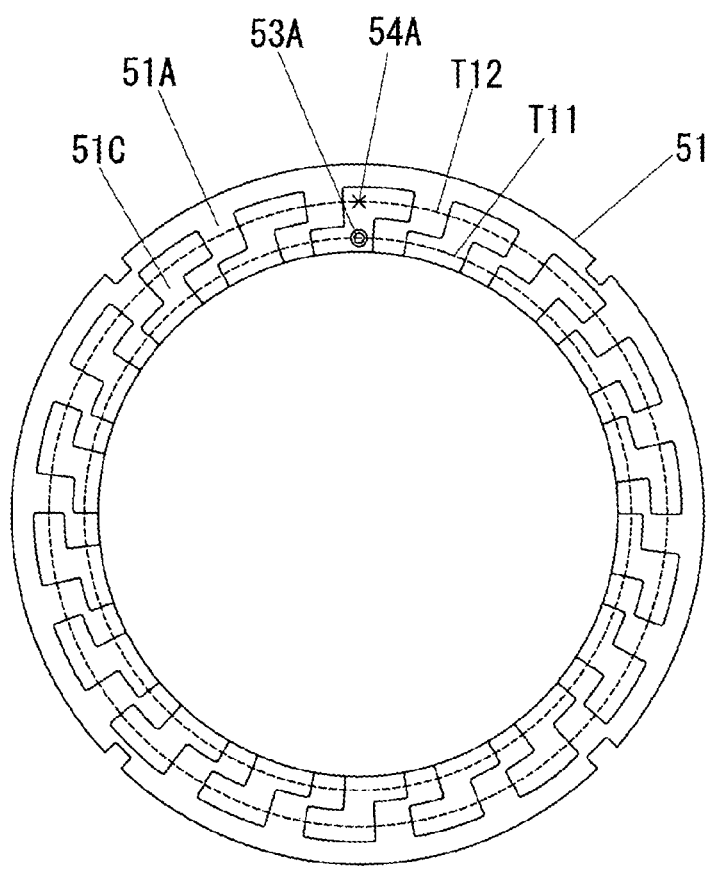
FIG. 11 is a diagram showing the relationship between a contact pattern of a wiring substrate and a contact of the input device shown in FIG. 9.

Firstly, with reference to FIGS. 10 and 11, a description will be given of rotary manipulation unit 1001. FIG. 10 is an exploded perspective view of rotary manipulation unit 1001. FIG. 11 shows the relationship between contact pattern 51A of wiring substrate 51 of rotary manipulation unit 1001 and contacts 53A, 54A of fixed electrodes 53, 54, respectively.

As shown in FIG. 10, similarly to rotary manipulation unit 1000 according to the first exemplary embodiment, rotary manipulation unit 1001 has lower casing 11, rotary body 16, click spring 120, holder 19, connecting electrodes 22, elastic bodies 21, first connecting terminal 24, rotary manipulation knob 23, and pressing body 25. Unless otherwise described, these components are similar to those of rotary manipulation unit 1000. In place of variable electrode 18 and fixed electrodes 13 of rotary manipulation unit 1000, rotary manipulation unit 1001 has second connecting terminal 58, fixed electrodes 53, 54, and wiring substrate 51.

In rotary manipulation unit 1001, wiring substrate 51 rotationally shifts in accordance with a rotary manipulation of rotary manipulation knob 23, and contact pattern 51A at the lower surface of wiring substrate 51 is brought into contact with or spaced apart from fixed electrodes 53, 54.

As described above, at the lower surface of the outer circumferential portion of rotary body 16, second connecting terminal 58 is fixed in place of variable electrode 18. Further, at the lower surface of the outer circumferential portion of rotary body 16, wiring substrate 51 formed to have an annular plate shape is fixed. Accordingly, wiring substrate 51 rotates together with rotary body 16.

Second connecting terminal 58 is formed by a thin elastic metal plate which is bent to be L-shaped. At the tip of one side of the L shape, contact 58A is formed. Other side structures fixing portion 58B which projects upward in a predetermined width. By fixing portion 58B being press-fitted into insert portion 16B provided at rotary body 16, second connecting terminal 58 is fixed to the lower surface of the outer circumferential portion of rotary body 16. By first connecting terminal 24 being elastically in contact with fixing portion 58B of second connecting terminal 58, second connecting terminal 58 and rotary manipulation knob 23 are electrically connected to each other.

As shown in FIG. 11, at the lower surface of wiring substrate 51, contact pattern 51A formed into a predetermined pattern is formed. On the other hand, as shown in FIG. 10, at the upper surface of wiring substrate 51, connection land 51B is provided. Connection land 51B and contact pattern 51A are electrically connected to each other. By contact 58A of second connecting terminal 58 being elastically in contact with connection land 51B, contact pattern 51A is electrically connected with rotary manipulation knob 23 via second connecting terminal 58 and first connecting terminal 24. Note that, as shown in FIG. 11, at the lower surface of wiring substrate 51, the regions other than contact pattern 51A structure insulating surfaces 51C.

As described above, at lower casing 11, two fixed electrodes 53, 54 are disposed in place of fixed electrodes 13. Fixed electrodes 53, 54 are each made of a thin metal plate and formed to be sector-shaped as seen in a top view. Fixed electrodes 53, 54 are each greater in area as seen in a top view than each fixed electrode 13. Fixed electrodes 53, 54 are respectively provided with contacts 53A, 54A which extend upward. In accordance with the rotary manipulation of rotary manipulation knob 23, contacts 53A, 54A are brought into contact with or spaced apart from contact pattern 51A of wiring substrate 51.

The sign "double circle" in FIG. 11 schematically represents the disposition position of contact 53A. Contact 53A is in contact with the lower surface of wiring substrate 51 at the position of the sign "double circle". Contact 53A slides on concentric track T11 in accordance with the rotational movement of rotary body 16. Similarly, the sign "cross" schematically represents the disposition position of contact 54A. Contact 54A is in contact with the lower surface of wiring substrate 51 at the position of the sign "cross". Contact 54A slides on concentric track T12 in accordance with the rotational movement of rotary body 16.

Figure 12:
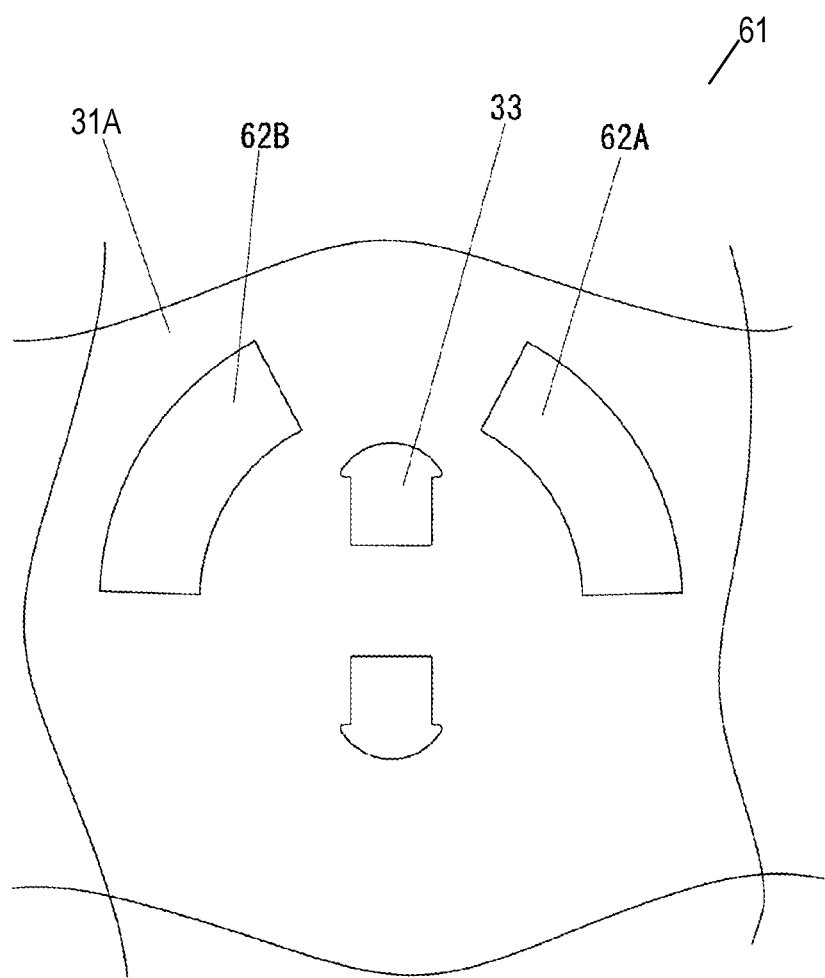
FIG. 12 is a top view showing the disposition pattern of sensor electrodes of a touch panel of the input device shown in FIG. 9.

Next, with reference also to FIG. 12, a description will be given of touch panel 61 of touch panel unit 2001. FIG. 12 is a top view showing the disposition pattern of sensor electrodes 33, 62A, 62B of touch panel 61.

With touch panel 61, in place of sensor electrodes 32, sensor electrodes 62A, 62B are disposed at the upper surface of first base member 31A. Sensor electrode 62A has a shape substantially identical to that of fixed electrode 53 as seen in a top view, and disposed at the position opposing to fixed electrode 53. Sensor electrode 62B has a shape substantially identical to that of fixed electrode 54 as seen in a top view, and disposed at the position opposing to fixed electrode 54. Note that, to sensor electrodes 62A, 62B, not-shown leads are respectively connected, so that sensor electrodes 62A, 62B are connected to a not-shown predetermined electronic circuit. Further, sensor electrodes 62A, 62B are formed to be transparent by ITO or the like. Note that, sensor electrodes 62A, 62B are not necessarily transparent, and may each be a thin metal film formed through vapor deposition or the like. Further, sensor electrodes 62A, 62B may be respectively structured by at least one transmitter electrode and at least one receiver electrode.

With input device 3001 structured as described above, a rotary manipulation of rotary manipulation knob 23 causes contact 53A to be brought into contact with or spaced apart from contact pattern 51A of wiring substrate 51. Their being brought into contact with or spaced apart changes capacitance between fixed electrode 53 and sensor electrode 62A. A not-shown electronic circuit detects this change in capacitance as signal A. Similarly, by the rotary manipulation of rotary manipulation knob 23, contact 54A is brought into contact with or spaced apart from contact pattern 51A. Their being brought into contact with or spaced apart changes capacitance between fixed electrode 54 and sensor electrode 62B. The electronic circuit detects this change in capacitance as signal B.

That is, with input device 3001, based on detecting a change in capacitance generated between fixed electrodes 53, 54 of rotary manipulation unit 1001 and sensor electrodes 62A, 62B of touch panel unit 2001, a rotary manipulation of rotary manipulation unit 1001 is detected. As described above, input device 3001 has sensor electrodes 62A, 62B being the first electrode, fixed electrodes 53, 54 being the second electrode, and contact pattern 51A being the third electrode. Fixed electrodes 53, 54 oppose to sensor electrodes 62A, 62B while being spaced apart therefrom. Contact pattern 51A is spaced apart from sensor electrodes 62A, 62B, and rotatably provided relative to fixed electrodes 53, 54. By contact pattern 51A being brought into electrical contact with or spaced apart from fixed electrodes 53, 54, an electrical state between sensor electrodes 62A, 62B and fixed electrodes 53, 54 changes. Based on this electrical change, a rotary manipulation can be detected.

Contact pattern 51A formed at the lower surface of wiring substrate 51 is a contact pattern for an encoder of the increment scheme. The shape of contact pattern 51A provides a predetermined phase difference, upon a rotary manipulation of rotary manipulation knob 23, between contact 53A and contact pattern 51A being brought into contact with or spaced apart from each other, and contact 54A and contact pattern 51A being brought into contact with or spaced apart from each other.

That is, the above-described signal A and signal B are output signals of the increment scheme. By an electronic circuit processing signal A and signal B, a rotary manipulation corresponding to the rotating direction or the rotary shift amount of rotary manipulation knob 23 can be detected.

In this structure also, since fixed electrodes 53, 54 do not shift relative to sensor electrodes 62A, 62B, variations in the clearance between fixed electrodes 53, 54 and sensor electrodes 62A, 62B are suppressed. Thus, capacitance generated between fixed electrode 53 and sensor electrode 62A, and that between fixed electrode 54 and sensor electrode 62B change always similarly in accordance with a certain rotary manipulation.

Further, since sensor electrodes 62A, 62B are each greater in area than each sensor electrode 32, higher detection sensitivity is obtained.

Note that, similarly to rotary manipulation unit 1000, with rotary manipulation unit 1001 also, contacts 53A, 54A are in contact with insulating surface 51C in the non-manipulation state. That is, contact pattern 51A and fixed electrodes 53, 54 are not brought into contact with each other in the non-manipulation state.

Accordingly, under the uniform condition, that is, none of fixed electrodes 53, 54 are in contact with contact pattern 51A, sensor electrodes 62A, 62B opposing to fixed electrodes 53, 54 can be calibrated. That is, calibration can be performed in the state where contact pattern 51A of wiring substrate 51 and rotary manipulation knob 23 are not prone to electrically influence sensor electrodes 62A, 62B.

Thus, without reducing the sensitivity of sensor electrodes 62A, 62B and while suppressing variations in sensitivity, a rotary manipulation can be stably detected.

Third Exemplary Embodiment

Figure 13:
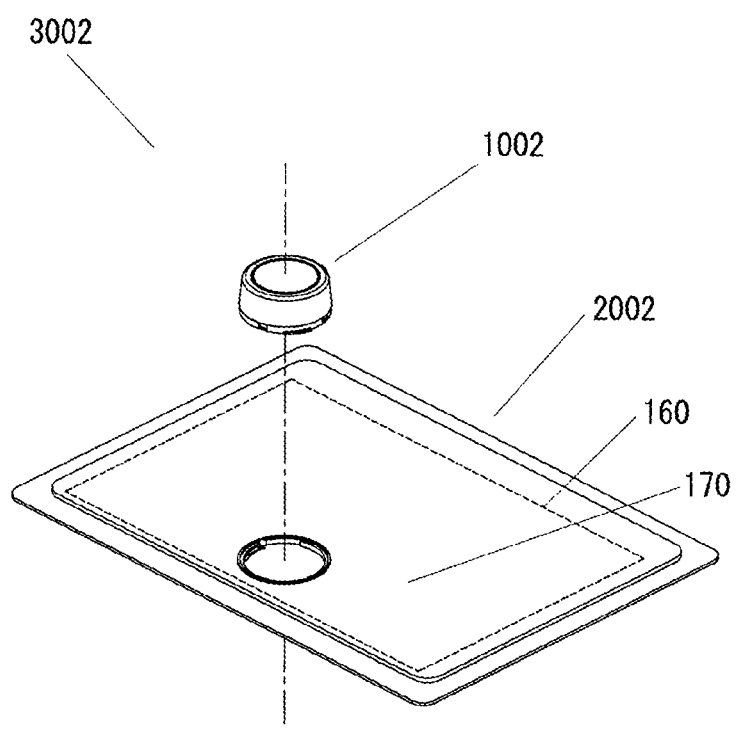
FIG. 13 is an exploded perspective view of an input device according to a third exemplary embodiment of the present invention.

Next, a description will be given of input device 3002 of the increment scheme according to a third exemplary embodiment of the present invention. FIG. 13 is an exploded perspective view of input device 3002. Input device 3002 has rotary manipulation unit 1002, and touch panel unit 2002 equipped with rotary manipulation unit 1002. Touch panel unit 2002 has touch panel 160, and cover panel 170 made of transparent resin and stacked on the upper surface of touch panel 160.

Figure 14:
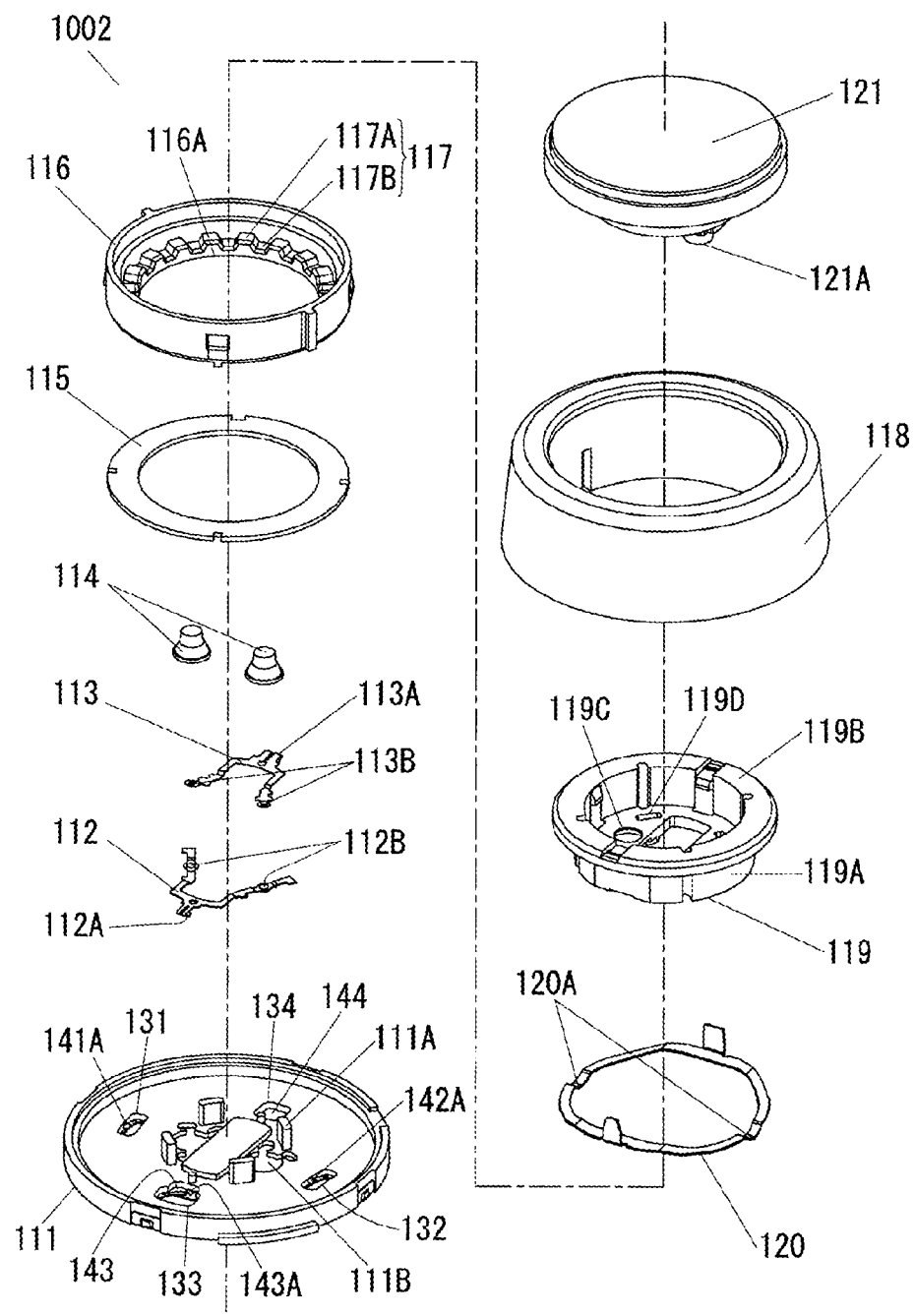
FIG. 14 is an exploded perspective view of a rotary manipulation unit of the input device shown in FIG. 13.
Figure 15:
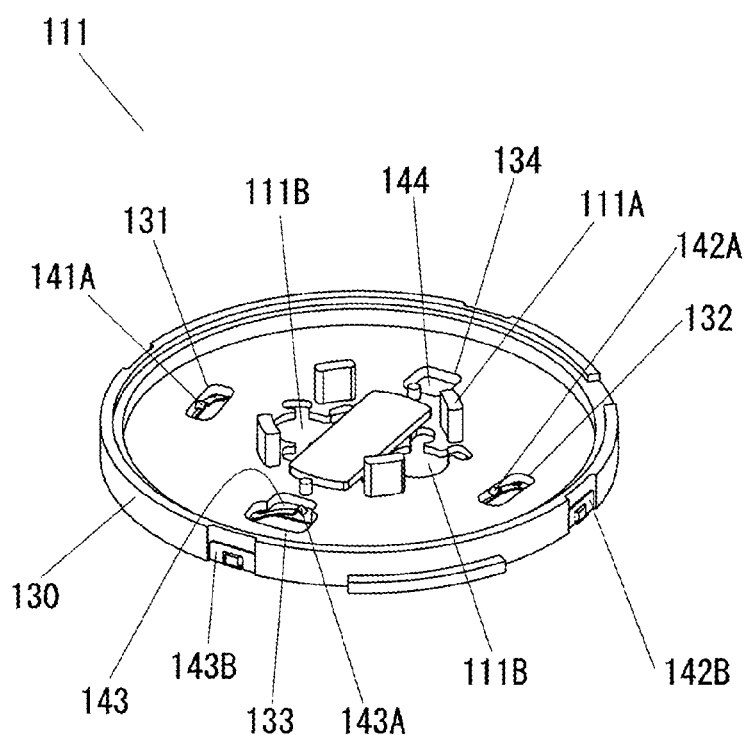
FIG. 15 is a perspective view of a lower casing of the input device shown in FIG. 13.
Figure 16:
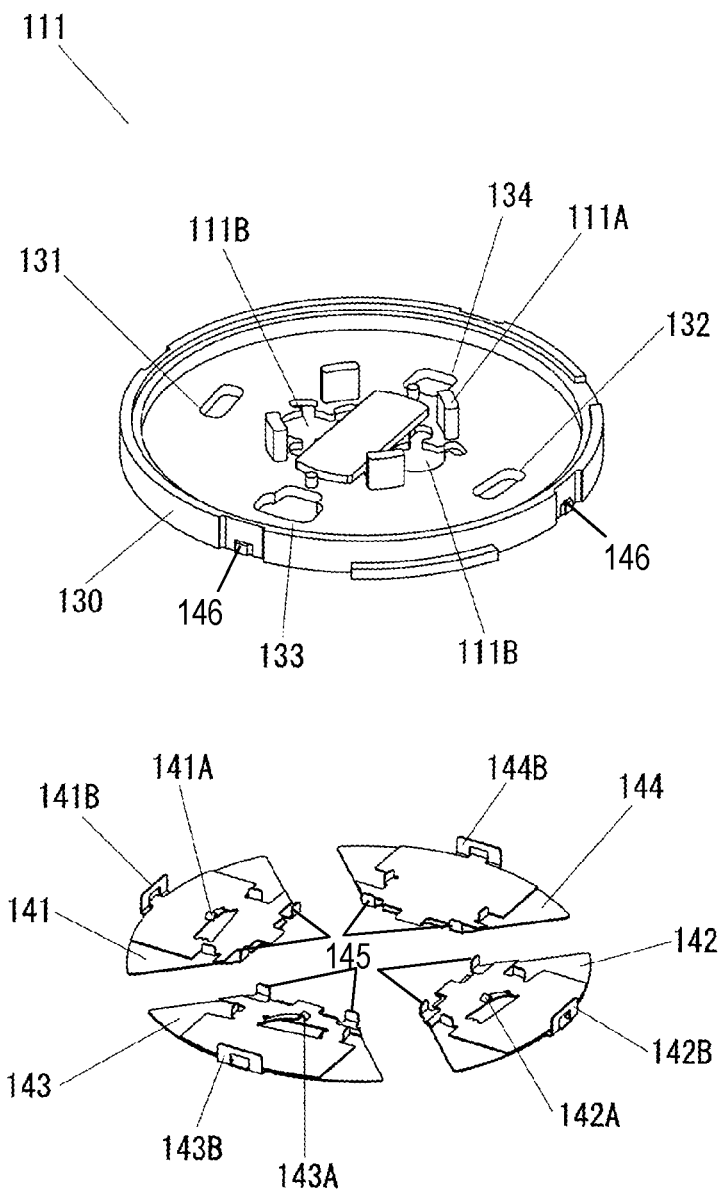
FIG. 16 is an exploded perspective view of the lower casing shown in FIG. 15.
Figure 17:
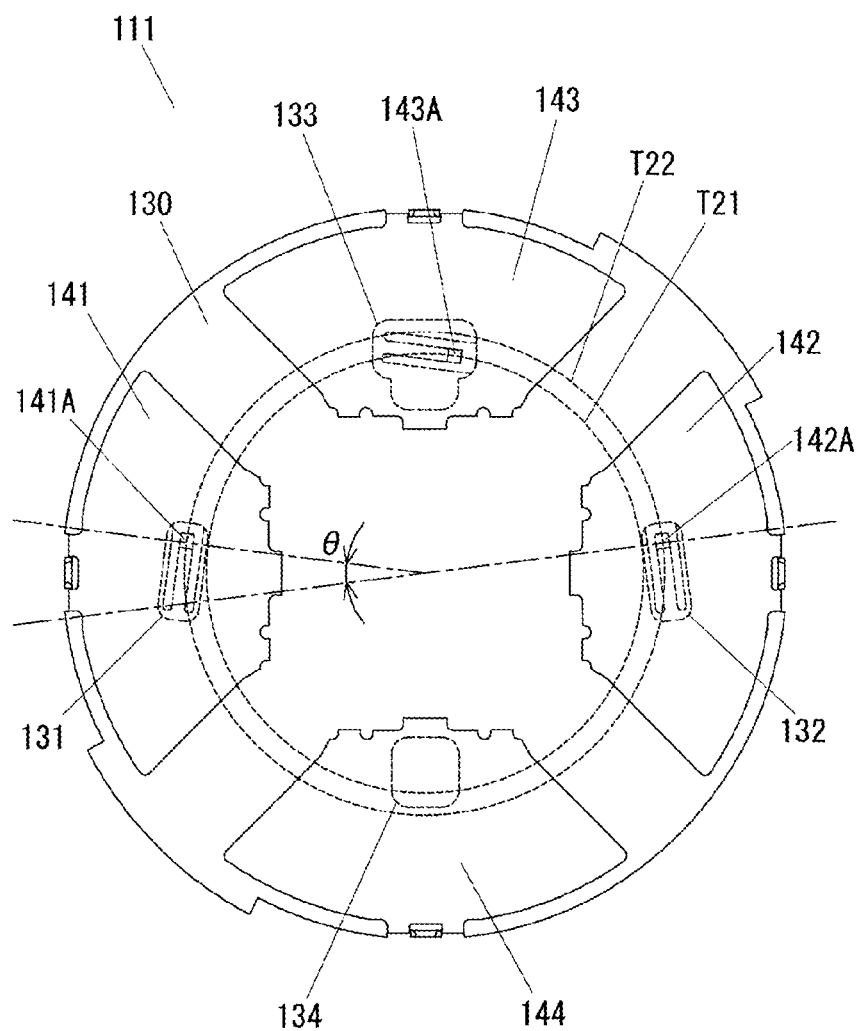
FIG. 17 is a bottom view of the lower casing shown in FIG. 15.
Figure 18:
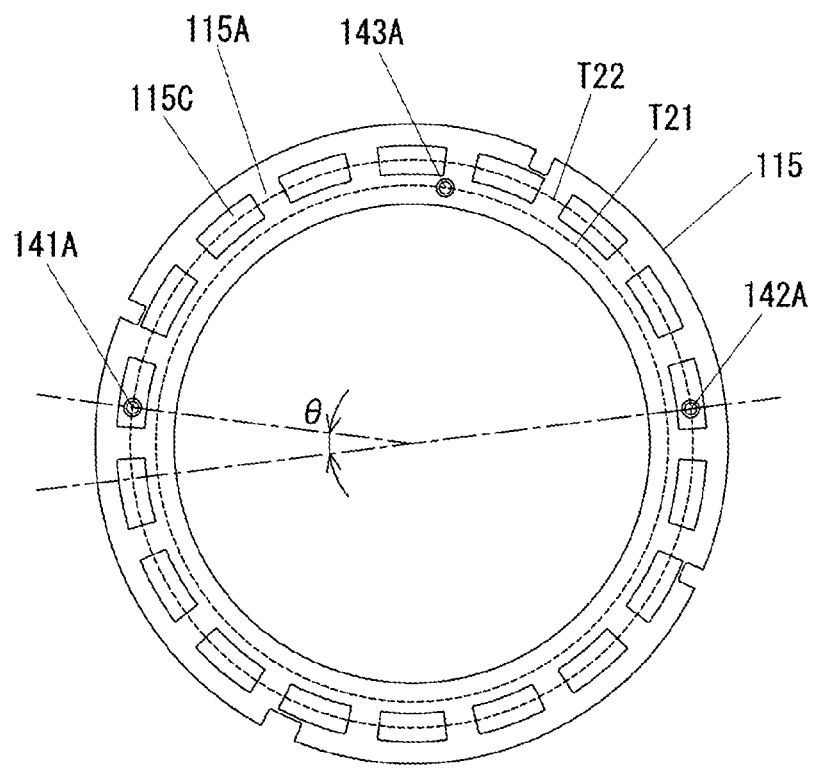
FIG. 18 is a diagram showing the relationship between a contact pattern of a wiring substrate and a contact of the input device shown in FIG. 13.

Firstly, with reference to FIGS. 14 to 18, a description will be given of rotary manipulation unit 1002. FIG. 14 is an exploded perspective view of rotary manipulation unit 1002. FIG. 15 is a perspective view of lower casing 111 of rotary manipulation unit 1002. FIG. 16 is an exploded perspective view of lower casing 111. FIG. 17 is a bottom view of lower casing 111. FIG. 18 shows the relationship between contact pattern 115A of wiring substrate 115 of rotary manipulation unit 1002 and contacts 141A to 143A.

As shown in FIG. 14, rotary manipulation unit 1002 has lower casing 111, first switch electrode 112, second switch electrode 113, elastic bodies 114, wiring substrate 115, rotary body 116, rotary manipulation knob 118, holder 119, click spring 120, and pressing body 121. As shown in FIG. 16, lower casing 111 includes resin portion 130, fixed electrode 141, fixed electrode 142, fixed electrode 143, and fixed electrode 144.

As shown in FIGS. 14 to 17, resin portion 130 made of insulating resin is provided with a concavity which opens upward. Resin portion 130 is circular as seen in a top view. To the lower surface of resin portion 130, fixed electrodes 141 to 144 are fixed. At the center of the concavity of resin portion 130, four pillars 111A extending upward and two recesses 111B are provided. Further, at resin portion 130, at the upper surface of the concavity outer than pillars 111A, four holes 131 to 134 are provided.

As shown in FIGS. 16 and 17, fixed electrodes 141 to 144 are each made of a thin metal plate which is sector-shaped as seen in a top view, and are substantially identical in shape as seen in a top view. Fixed electrodes 141 to 144 respectively have hook portions 141B to 144B which are each U-shaped projecting upward. Further, fixed electrodes 141 to 144 are each provided with projection 145 which projects upward in a predetermined width. Fixed electrodes 141 to 144 are fixed to the lower surface of resin portion 130 by hook portions 141B to 144B and projections 145. Specifically, hook portions 141B to 144B respectively engage with engaging portions 146 provided at the outer circumference of resin portion 130, and projections 145 respectively engage with engaging holes (not shown) provided at the lower surface of resin portion 130. Thus, fixed electrodes 141 to 144 are exposed at the lower surface of lower casing 111.

Further, fixed electrodes 141 to 143 are respectively provided with contacts 141A to 143A which project upward. Contacts 141A to 143A project higher than the concavity of resin portion 130 through holes 131 to 133 of resin portion 130. Contacts 141A to 143A are in contact with the lower surface of wiring substrate 115 shown in FIGS. 14 and 18. Fixed electrode 144 is partially exposed at hole 134 of resin portion 130.

As shown in FIG. 14, first switch electrode 112 is a thin metal plate formed to have a predetermined shape. First switch electrode 112 has contact 112A which is bent downward, and two contact portions 112B which are each circular as seen in a top view and project slightly upward. First switch electrode 112 is mounted on the upper surface of the concavity of lower casing 111. Contact 112A is in contact with contact 143A of fixed electrode 143 exposed at hole 133. Two contact portions 112B are respectively housed in two recesses 111B.

Similarly, second switch electrode 113 is a thin metal plate formed to have a predetermined shape. Second switch electrode 113 has contact 113A which is bent downward, and two contact portions 113B which are each circular as seen in a top view and project slightly downward. Second switch electrode 113 is also mounted on the upper surface of the concavity of lower casing 111. Contact 113A is in contact with fixed electrode 144 exposed at hole 134. Two contact portions 113B are respectively housed in two recesses 111B. Note that, contact portions 112B of first switch electrode 112 and contact portions 113B of second switch electrode 113 oppose to each other while being spaced apart from each other by a predetermined gap. That is, first switch electrode 112 and second switch electrode 113 are not in contact with each other.

As shown in FIG. 14, elastic bodies 114 made of rubber each have a shape of truncated cone whose bottom side is open. Elastic bodies 114 have their bottom portions housed in recesses 111B of lower casing 111, respectively. Elastic bodies 114, first switch electrode 112, and second switch electrode 113 form a push button. That is, when the user pushes pressing body 121, pressing portions 121A push elastic bodies 114, whereby elastic bodies 114 buckling deform with steps downward. Thus, contact portions 112B of first switch electrode 112 and contact portions 113B of second switch electrode 113 are brought into contact with each other. In other words, fixed electrode 143 and fixed electrode 144 are electrically connected to each other via first switch electrode 112 and second switch electrode 113.

Holder 119 made of insulating resin is circular as seen in a top view. Holder 119 has bottomed cylinder 119A and flange 119B which annularly projects in the outer diameter direction from the top of cylinder 119A. At the lower surface of flange 119B, click spring 120 made of elastic metal and annular as seen in a top view is swaged.

At the bottom surface of holder 119, swage holes 119D are provided. By pillars 111A of lower casing 111 being respectively inserted into swage holes 119D and having their tips swaged, holder 119 is fixed to lower casing 111.

At the bottom surface of holder 119, button mounting portions 119C, which are each a circular through hole slightly smaller than the bottom portion of elastic body 114, are formed. Elastic bodies 114 are inserted into button mounting portions 119C and thereby retained by holder 119.

Rotary body 116 made of insulating resin is provided with central hole 116A, and formed to be annular as seen in a top view. Cylinder 119A of holder 119 is inserted into central hole 116A of rotary body 116. Accordingly, rotary body 116 is rotatably fixed relative to holder 119. Over the entire inner circumference of rotary body 116, concavity-convexity portion 117 having concavities and convexities on the upper side is provided. In concavity-convexity portion 117, convexities 117A projecting upward and concavities 117B recessed downward are alternately formed. Projections 120A of click spring 120 are elastically in contact with the upper surface of concavity-convexity portion 117 of rotary body 116. Thus, when the user rotates rotary body 116, a click step corresponding to a predetermined rotation angle is obtained. As described above, the relationship among holder 119, click spring 120, and rotary body 116 is similar to that among holder 19, click spring 20, and rotary body 16 according to the first exemplary embodiment.

As shown in FIGS. 14 and 18, wiring substrate 115 is annular as seen in a top view. At the lower surface of wiring substrate 115, contact pattern 115A which is a conductive region having a predetermined pattern is formed. Note that, the regions other than contact pattern 115A structure insulating surfaces 115C being insulating regions. Wiring substrate 115 is fixed to the lower surface of the outer circumferential portion of rotary body 116, and rotates together with rotary body 116. Contacts 141A to 143A are elastically in contact with the lower surface of wiring substrate 115.

The sign "double circle" shown in FIG. 18 schematically represents the disposition positions of contacts 141A to 143A. Contacts 141A to 143A are in contact with the lower surface of wiring substrate 115 at the positions of the sign "double circle". Contact 141A of fixed electrode 141 and contact 142A of fixed electrode 142 slide on concentric track T22 in accordance with a rotational movement of rotary body 116. As shown in FIGS. 17 and 18, contact 141A is disposed at the angular position where predetermined phase difference (θ) is established relative to contact 142A. This provides a predetermined phase difference, upon a rotation of rotary body 116, between contact pattern 115A and contact 141A being brought into contact with or spaced apart from each other, and contact pattern 115A and contact 142A being brought into contact with or spaced apart from each other. On the other hand, contact 143A of fixed electrode 143 slides on concentric track T21 in accordance with a rotational movement of rotary body 116. Since contact pattern 115A is formed over the entire track T21, contact pattern 115A and contact 143A are always in contact with each other irrespective of the rotational movement of rotary body 116.

As shown in FIG. 14, rotary manipulation knob 118 made of resin is annular as seen in a top view. Rotary manipulation knob 118 is fixed to rotary body 116 and rotates together with rotary body 116.

Pressing body 121 made of resin is circular as seen in a top view, and has pressing portions 121A which project downward. Pressing body 121 is vertically movably fixed inside holder 119. Pressing portions 121A of pressing body 121 have their respective lower surfaces abutted on the upper surfaces of elastic bodies 114.

Rotary manipulation unit 1002 is structured in the above-described manner. Fixed electrodes 141 to 144 of rotary manipulation unit 1002 oppose to the upper surface of touch panel 160 of touch panel unit 2002.

Figure 19:
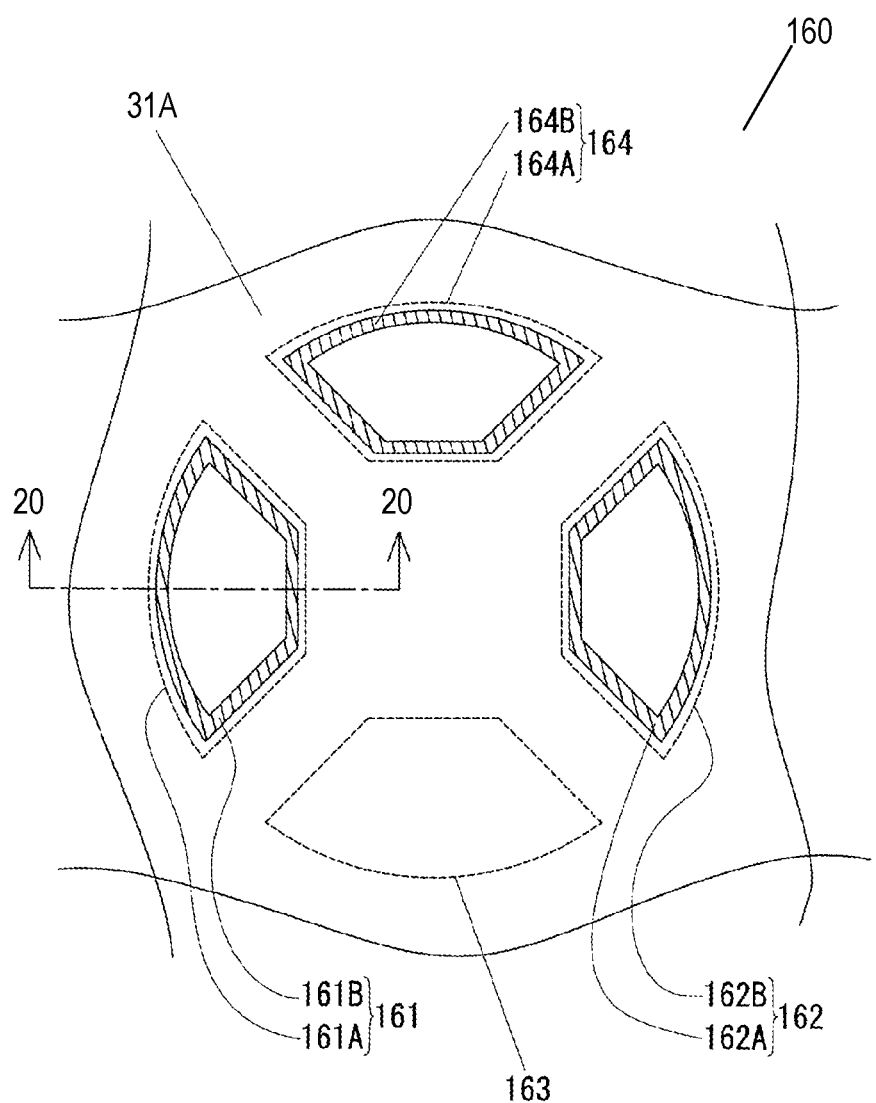
FIG. 19 is a top view showing the disposition pattern of sensor electrodes of a touch panel of the input device shown in FIG. 13.
Figure 20:
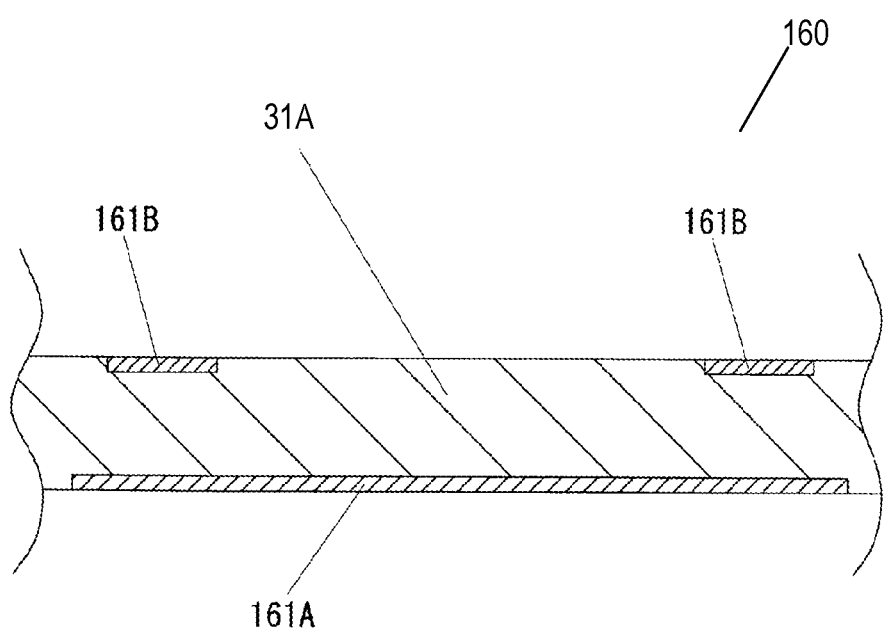
FIG. 20 is a cross-sectional view taken along line 20-20 in FIG. 19.

Next, with reference to FIGS. 13, 19, and 20, a description will be given of touch panel unit 2002. FIG. 19 is a top view showing the disposition pattern of sensor electrodes 161, 162, 164 of touch panel 160 in touch panel unit 2002. FIG. 20 is a cross-sectional view taken along line 20-20 in FIG. 19.

As shown in FIG. 19, touch panel 160 has first base member 31A, sensor electrodes 161, 162, 164, and ground electrode 163. Sensor electrodes 161, 162, 164 are formed at the positions opposing to the lower surfaces of fixed electrodes 141, 142, 144, respectively. Ground electrode 163 is formed at the position opposing to the lower surface of fixed electrode 143. Note that, to sensor electrodes 161, 162, 164, not-shown leads are respectively connected, so that sensor electrodes 161, 162, 164 are connected to a not-shown predetermined electronic circuit. Further, to ground electrode 163, a not-shown lead is connected, so that ground electrode 163 is connected to ground potential of the electronic circuit.

Touch panel 160 is of the capacitance scheme. That is, touch panel 160 detects a change in capacitance formed between electrically conductive bodies (fixed electrodes 141, 142, 144) in contact with or in close proximity to its upper surface and sensor electrodes 161, 162, 164. That is, touch panel 160 is just required to be capable of detecting a change in capacitance, and therefore it may be of the self capacitance type or the mutual capacitance type. Further, touch panel 160 may be surface capacitive or projected capacitive. Note that, in the following description, a description will be exemplarily given of touch panel 160 of the mutual capacitance type.

As shown in FIG. 19, in touch panel 160, sensor electrode 161 is structured by a pair of transmitter electrode 161A and receiver electrode 161B. Similarly, sensor electrode 162 is structured by a pair of transmitter electrode 162A and receiver electrode 162B. Sensor electrode 164 is structured by a pair of transmitter electrode 164A and receiver electrode 164B. Note that, in FIG. 19, receiver electrodes 161B, 162B, 164B are hatched.

As shown in FIG. 20, receiver electrode 161B is disposed at the upper surface of first base member 31A (the surface opposing to fixed electrode 141), and transmitter electrode 161A is disposed at the lower surface of first base member 31A. Note that, while not shown in the drawing, in sensor electrodes 162, 164 also, receiver electrodes 162B, 164B are disposed at the upper surface of first base member 31A, and transmitter electrodes 162A, 164B are disposed at the lower surface of first base member 31A. Note that, while not shown in the drawing, ground electrode 163 is disposed at the upper surface of first base member 31A (the surface opposing to fixed electrode 143).

Next, a description will be given of the shape of sensor electrodes 161, 162, 164 and ground electrode 163.

Transmitter electrodes 161A, 162A, 164A are sector-shaped as seen in a top view, and substantially identical to the shape of fixed electrodes 141 to 144 as seen in a top view. The outer edge of each of receiver electrodes 161B, 162B, 164B is formed to be sector-shaped as seen in a top view. Receiver electrodes 161B, 162B, 164B are annular. Note that, outer edges of receiver electrodes 161B, 162B, 164B are formed inner than the outer edges of transmitter electrodes 161A, 162A, 164A, respectively. This structure reduces the influence of electrical noises occurring from the lower surface side of touch panel 160 on sensor electrodes 161, 162, 164.

In brief, for example when touch panel 160 is mounted on a liquid crystal panel or the like, electromagnetic wave noises occurring from the liquid crystal panel or the like are emitted from the lower surface of touch panel 160 to the upper surface thereof. Further, receiver electrodes 161B, 162B, 164B are susceptible to electromagnetic wave noises as compared to transmitter electrodes 161A, 162A, 164A. In the present embodiment, receiver electrodes 161B, 162B, 164B are smaller than transmitter electrodes 161A, 162A, 164A. Accordingly, with touch panel 160, the electromagnetic wave noises are blocked by transmitter electrodes 161A, 162A, 164A. Therefore, electromagnetic wave noises are not prone to enter receiver electrodes 161B, 162B, 164B. In other words, transmitter electrodes 161A, 162A, 164A are capable of protecting receiver electrodes 161B, 162B, 164B which are susceptible to electromagnetic wave noises. This prevents a reduction in detection sensitivity of sensor electrodes 161, 162, 164 due to electromagnetic wave noises.

Note that, the shape of fixed electrodes 141, 142, 144 as seen in a top view may be smaller than that of sensor electrodes 161, 162, 164. For example, fixed electrodes 141, 142, 144 may be smaller than the inner edge of receiver electrodes 161B, 162B, 164B, and fixed electrodes 141, 142, 144 may oppose to just transmitter electrodes 161A, 162A, 164A. In this case also, since fixed electrodes 141, 142, 144 and sensor electrodes 161, 162, 164 (receiver electrodes 161B, 162B, 164B) oppose to each other, a rotary manipulation can be detected. Further, the shape of fixed electrodes 141, 142, 144 as seen in a top view may be greater than that of sensor electrodes 161, 162, 164.

Ground electrode 163 is sector-shaped as seen in a top view, and is substantially identical to the shape of fixed electrode 143 as seen in a top view.

Sensor electrodes 161, 162, 164 and ground electrode 163 are formed to be transparent by ITO or the like. Further, sensor electrodes 161, 162, 164 and ground electrode 163 may each be a thin metal film formed through vapor deposition or the like. Further, while it has been described that transmitter electrodes 161A, 162A, 164A and receiver electrodes 161B, 162B, 164B are formed on different planes, they may be formed on an identical plane. It is just required that each of transmitter electrodes 161A, 162A, 164A and each of receiver electrodes 161B, 162B, 164B is electrically independent. For example, transmitter electrodes being comb-like as seen in a top view and receiver electrodes being comb-like as seen in a top view may be formed on an identical plane.

Input device 3002 is structured as described above. Next, a description will be given of an operation of input device 3002 upon a rotary manipulation.

Since fixed electrode 143 opposes to ground electrode 163 of touch panel 160 in close proximity, fixed electrode 143 and ground electrode 163 are largely capacitively coupled with each other. In other words, fixed electrode 143 and ground electrode 163 are electrically connected to each other in terms of alternating-current components.

When the user rotationally manipulates rotary manipulation knob 118, contacts 141A, 142A are brought into contact with or spaced apart from contact pattern 115A of wiring substrate 115. Since contact 143A is always in contact with contact pattern 115A, for example, when contact 141A is brought into contact with contact pattern 115A, fixed electrode 141 and fixed electrode 143 are electrically connected to each other. As a result, fixed electrode 141 is electrically connected to ground electrode 163, whereby the electrical state of fixed electrode 141 changes. Thus, capacitance between fixed electrode 141 and sensor electrode 161 changes. In this manner, a change in the electrical state of fixed electrode 141 disposed in close proximity to sensor electrode 161 changes capacitance (capacitive coupling) formed between transmitter electrode 161A and receiver electrode 161B. A not-shown electronic circuit detects this change in capacitance as signal A.

Similarly, by contact 142A being brought into contact with or spaced apart from contact pattern 115A upon a rotary manipulation, capacitance between fixed electrode 142 and sensor electrode 162 changes. That is, the electrical state of fixed electrode 142 disposed near sensor electrode 162 changes. Accordingly, capacitance (capacitive coupling) formed between transmitter electrode 162A and receiver electrode 162B changes. The electronic circuit detects this change in capacitance as signal B.

As shown in FIG. 18, a plurality of insulating surfaces 115C formed on track T22 of wiring substrate 115 are disposed at equal angular intervals. That is, on track T22, contact patterns 115A are disposed at equal angular intervals so that contact patterns 115A and insulating surfaces 115C are alternately disposed. Contacts 141A, 142A slide on track T22. As shown in FIGS. 17 and 18, contact 141A is disposed at the angular position where predetermined phase difference (θ) is established relative to contact 142A. This provides a predetermined phase difference, upon a rotary manipulation of rotary manipulation knob 118, between contact pattern 115A and contact 141A being brought into contact with or spaced apart from each other, and contact pattern 115A and contact 142A being brought into contact with or spaced apart from each other. Thus, signal A and signal B become output signals of the increment scheme having a predetermined phase difference. By an electronic circuit processing signal A and signal B, a rotary manipulation corresponding to the rotating direction or the rotary shift amount of rotary manipulation knob 118 is detected.

That is, with input device 3002, wiring substrate 115 is rotationally shifted in accordance with a rotary manipulation of rotary manipulation unit 1002. In accordance with the rotary manipulation, contact 141A of fixed electrode 141 and contact 142A of fixed electrode 142 are brought into contact with or spaced apart from contact pattern 115A at the lower surface of wiring substrate 115 shown in FIG. 18. Input device 3002 detects a change in capacitance between fixed electrodes 141, 142 of rotary manipulation unit 1002 shown in FIGS. 16 and 17 and sensor electrodes 161, 162 of touch panel 160 shown in FIGS. 19 and 20, thereby detecting the rotary manipulation of rotary manipulation unit 1002. As has been described above, input device 3002 has sensor electrodes 161, 162 being the first electrode, fixed electrodes 141, 142 being the second electrode, and contact pattern 115A being the third electrode. Fixed electrodes 141, 142 oppose to sensor electrodes 161, 162 while being spaced apart therefrom. Contact pattern 115A is spaced apart from sensor electrodes 161, 162, and rotatably provided relative to fixed electrodes 141, 142. By contact pattern 115A being brought into contact with or spaced apart from fixed electrodes 141, 142, an electrical state between sensor electrodes 161, 162 and fixed electrodes 141, 142 changes. Based on this electrical change, a rotary manipulation can be detected.

In this structure also, since fixed electrodes 141, 142 do not shift relative to sensor electrodes 161, 162, variations in the clearance between fixed electrodes 141, 142 and sensor electrodes 161, 162 are suppressed. Thus, capacitance generated between fixed electrode 141 and sensor electrode 161, and that between fixed electrode 142 and sensor electrode 162 change always similarly in accordance with a certain rotary manipulation.

Further, as shown in FIG. 19, preferably sensor electrode 161 and sensor electrode 162 are formed line-symmetric so that one corresponds to a mirror image of the other. This suppresses variations in sensitivity of sensor electrode 161 and sensor electrode 162. That is, variations in the output intensity of signal A and signal B are suppressed, and therefore a rotary manipulation can be stably detected. Further, by virtue of the increased distance between sensor electrode 161 and sensor electrode 162, mutual electrical influence can be suppressed. This also suppresses variations in the output intensity of signal A and signal B.

Note that, similarly to rotary manipulation unit 1001, with rotary manipulation unit 1002 also, contacts 141A, 142A are in contact with insulating surfaces 115C in the non-manipulation state. That is, in the non-manipulation state, none of fixed electrodes 141, 142 are in contact with contact pattern 115A.

Accordingly, under the uniform condition, that is, none of fixed electrodes 141, 142 are in contact with contact pattern 51A, sensor electrodes 161, 162 can be calibrated. That is, calibration can be performed in the state where contact pattern 115A of wiring substrate 115 and fixed electrode 143 are not prone to electrically influence sensor electrodes 161, 162. Thus, without reducing the sensitivity of sensor electrodes 161, 162, and while suppressing variations in sensitivity, a rotary manipulation can be stably detected.

Next, a brief description will be given of an operation of input device 3002 upon a press manipulation.

As described above, fixed electrode 143 and ground electrode 163 are largely capacitively coupled with each other, and hence are electrically connected to each other in terms of alternating-current components. When the user presses downward the upper surface of pressing body 121 with his/her finger or the like, elastic bodies 114 buckling deform with steps downward. Thus, contact portions 112B of first switch electrode 112 and contact portions 113B of second switch electrode 113 are brought into contact with each other, and fixed electrode 143 and fixed electrode 144 are electrically connected to each other. Accordingly, fixed electrode 144 is electrically connected to ground electrode 163 via second switch electrode 113, first switch electrode 112, and fixed electrode 143, which changes an electrical state of fixed electrode 144. This changes capacitance generated between fixed electrode 144 and sensor electrode 164. In other words, the electrical state of fixed electrode 144 disposed in close proximity to sensor electrode 164 changes, and capacitance (capacitive coupling) formed between transmitter electrode 164A and receiver electrode 164B changes. By a not-shown electronic circuit detecting this change in capacitance, the press manipulation is detected. Note that, when the press manipulation is cancelled, elastic bodies 114 recover the original shape, and contact between first switch electrode 112 and second switch electrode 113 is cancelled.

As has been described above, input device 3002 has ground electrode 163 which is the fourth electrode electrically connected to contact pattern 115A. When input device 3002 is rotationally manipulated, in place of the user's finger, ground electrode 163 is electrically connected to fixed electrode 141, and capacitance between fixed electrode 141 and sensor electrode 161 changes. Similarly, in place of the user's finger, ground electrode 163 is electrically connected to fixed electrode 142, and capacitance between fixed electrode 142 and sensor electrode 162 changes. Thus, even when rotary manipulation knob 118 is made of resin and the user's finger is not electrically connected to the fixed electrode, the rotary manipulation can be detected. Further, when input device 3002 is pressingly manipulated, in place of the user's finger, ground electrode 163 is electrically connected to fixed electrode 144, and capacitance between fixed electrode 144 and sensor electrode 164 changes. Thus, even when pressing body 121 is made of resin and the user's finger is not electrically connected to the fixed electrode, the press manipulation can be detected.

In this manner, input device 3002 does not require an electrical connection between the user's finger and the fixed electrode as shown in first and second exemplary embodiments for causing a change in capacitance. Accordingly, for example, when the user wearing thick gloves manipulates input device 3002 also, the rotary manipulation or the press manipulation can be easily detected. That is, input device 3002 can stably detect a rotary manipulation or a press manipulation regardless of the difference in the manipulation situation attributed to the user such as presence/absence of gloves. Note that, rotary manipulation knob 118 and pressing body 121 are not essentially made of resin. For example, they may be made of metal similarly to rotary manipulation knob 23 and pressing body 25.

Note that, with input device 3002, rotary manipulation knob 118 and fixed electrodes 141, 142 are not electrically connected to each other. Accordingly, for example, when the user's finger or other electrically conductive body inadvertently touches rotary manipulation knob 118, capacitance is not prone to change. Thus, with input device 3002, stable outputs with reduced noises can be obtained from sensor electrodes 161, 162.

Note that, in the foregoing description, ground electrode 163 is connected to ground. However, it is not essential for the potential of ground electrode 163 to be ground potential. For example, so long as a potential difference exists between ground electrode 163 and sensor electrodes 161, 162, 164 (transmitter electrodes 161A, 162A, 164A), ground electrode 163 may be connected to any reference potential. Further, such a reference potential may be constant or variable. That is, a voltage being different from a predetermined voltage applied to sensor electrodes 161, 162, 164 (transmitter electrodes 161A, 162A, 164A) may be applied to ground electrode 163.

Note that, with rotary manipulation unit 1002, fixed electrodes 141 to 144 are exposed at the lower surface of lower casing 111. This reduces the distance between sensor electrodes 161, 162, 164 and fixed electrodes 141, 142, 144, whereby electrical coupling between them increases. Similarly, the distance between ground electrode 163 and fixed electrode 143 is reduced, whereby electrical coupling between them increases. This increases a change in capacitance, whereby a rotary manipulation or a press manipulation can be stably detected.

As has been described above, input devices 3001, 3002 according to the second and third exemplary embodiments each have a plurality of sensor electrodes and fixed electrodes. The annular contact pattern being the third electrode being brought into contact with or spaced apart from the fixed electrodes changes an electrical state between the sensor electrodes and respective opposing fixed electrodes so that a phase difference occurs. Obtaining output signals of the increment scheme in this manner enables to detect a rotary manipulation corresponding to the rotating direction or the rotary shift amount of the rotary manipulation knob.

Fourth Exemplary Embodiment

In the first to third exemplary embodiments, a description has been given of the input device of the rotary manipulation type. In a fourth exemplary embodiment of the present invention, a description will be given of input device 3003 of the slide manipulation type.

Figure 21:
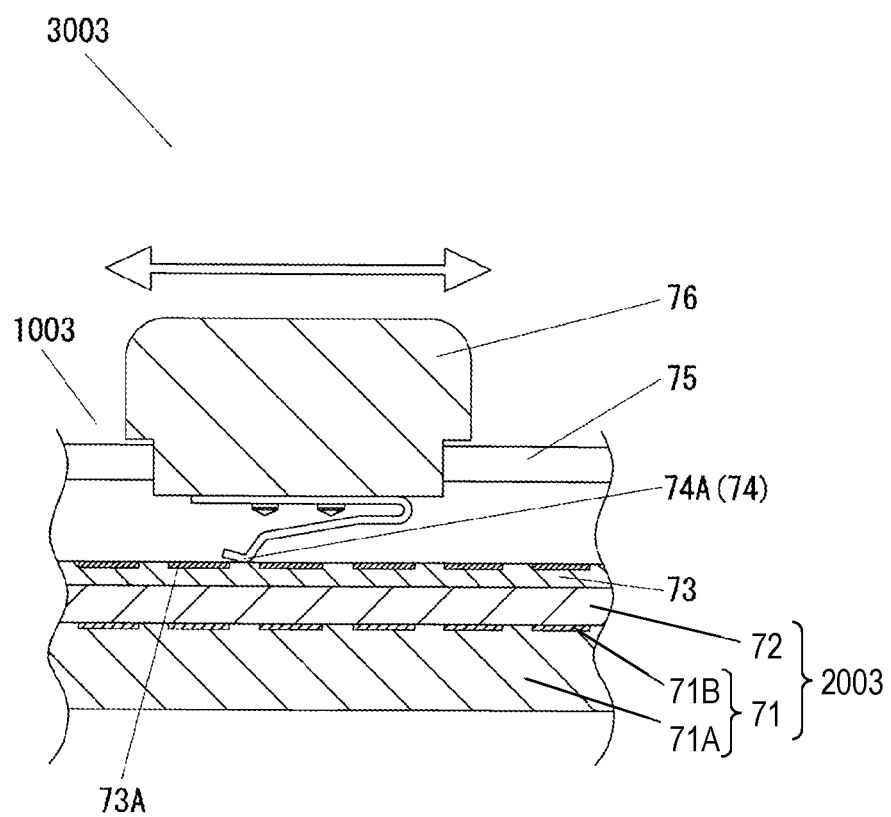
FIG. 21 is a cross-sectional view of an input device according to a fourth exemplary embodiment of the present invention.

FIG. 21 is a cross-sectional view of input device 3003. Input device 3003 has slide manipulation portion 1003, and touch panel unit 2003 equipped with slide manipulation portion 1003.

Slide manipulation portion 1003 has lower casing 73, a plurality of fixed electrodes 73A, variable electrode 74, upper casing 75, and slide manipulation knob 76. Further, slide manipulation portion 1003 has a not-shown clicking mechanism. Note that, similarly to that of rotary manipulation unit 1000, the clicking mechanism may have projections of a click spring elastically in contact with the upper surface of a concavity-convexity portion, so that a click step can be obtained corresponding to a predetermined shift amount upon a slide manipulation.

More specifically, the clicking mechanism of slide manipulation portion 1003 is structured by a concavity-convexity portion having its position fixed relative to fixed electrodes 73A, and a click spring having its position fixed relative to slide manipulation knob 76. This concavity-convexity portion is linearly disposed in the slide manipulation direction. On the upper surface of the concavity-convexity portion, projections of the click spring are elastically in contact. Thus, upon a slide manipulation, a click step can be obtained corresponding to a predetermined shift amount.

Touch panel unit 2003 has touch panel 71 and cover panel 72.

Touch panel 71 has first base member 71A, and a plurality of sensor electrodes 71B which are linearly disposed at the upper surface of first base member 71A. Sensor electrodes 71B are formed to be transparent by ITO or the like. Note that, sensor electrodes 71B are not necessarily transparent, and may each be a thin metal film formed through vapor deposition or the like. Further, sensor electrodes 71B may be structured by at least one transmitter electrode and at least one receiver electrode.

Fixed electrodes 73A disposed at the upper surface of lower casing 73 each oppose to one of sensor electrodes 71B via lower casing 73 and cover panel 72.

In this structure, when the user slidingly manipulates slide manipulation knob 76 of slide manipulation portion 1003 in the direction represented by arrow in FIG. 21, variable electrode 74 fixed to the lower portion of slide manipulation knob 76 linearly shifts. Thus, contact 74A of variable electrode 74 is brought into contact with or spaced apart from fixed electrodes 73A in accordance with the shifted position of slide manipulation knob 76.

Variable electrode 74 is electrically connected to slide manipulation knob 76. When the user's finger touches slide manipulation knob 76, the user's finger and variable electrode 74 are electrically connected to each other.

Accordingly, when the user slidingly manipulates slide manipulation knob 76 with his/her finger or the like, capacitance between fixed electrode 73A brought into contact with variable electrode 74 and sensor electrode 71B changes. By a not-shown electronic circuit detecting this change in capacitance, input device 3003 can detect the position of variable electrode 74. Based on the detection, a device equipped with input device 3003 is manipulated in accordance with the shifting direction or the shift amount of slide manipulation knob 76.

In this structure, since fixed electrodes 73A do not shift relative to sensor electrodes 71B, variations in the clearance between fixed electrodes 73A and sensor electrodes 71B are suppressed. Thus, capacitance generated between fixed electrodes 73A and sensor electrodes 71B changes always similarly in accordance with a certain slide manipulation.

As has been described above, input device 3003 detects a change in capacitance generated between fixed electrode 73A of slide manipulation portion 1003 and sensor electrodes 71B of touch panel unit 2003, thereby detects a slide manipulation. That is, input device 3003 has sensor electrodes 71B being the first electrode, fixed electrodes 73A being the second electrode, and variable electrode 74 being the third electrode. Fixed electrodes 73A oppose to sensor electrodes 71B while being spaced apart therefrom. Variable electrode 74 is spaced apart from sensor electrodes 71B, and slidably provided relative to fixed electrodes 73A. By variable electrode 74 being brought into contact with or spaced apart from fixed electrodes 73A, an electrical state between sensor electrode 71B and fixed electrode 73A changes. Based on this electrical change, a slide manipulation can be detected.

Note that, similarly to rotary manipulation units 1000, 1001, with slide manipulation portion 1003 also, the above-described clicking mechanism is structured such that variable electrode 74 and fixed electrodes 73A are not in contact with each other in the non-manipulation state. Accordingly, under the uniform condition, that is, variable electrode 74 is in contact with none of fixed electrodes 73A, all sensor electrodes 71B can be calibrated. That is, calibration can be performed in the state where variable electrode 74 and slide manipulation knob 76 are not prone to electrically influence sensor electrodes 71B. Thus, without reducing the sensitivity of sensor electrodes 71B, and while suppressing variations in sensitivity, a slide manipulation can be stably detected.

INDUSTRIAL APPLICABILITY

The input device of the present invention is capable of stably detecting a predetermined manipulation, and therefore is useful as an input manipulation unit of various electronic devices.

REFERENCE MARKS IN THE DRAWINGS 11, 73, 111: lower casing
11A, 111A: pillar
11B, 111B: recess
12: groove
13, 13A, 13B, 53, 54, 73A, 141, 142, 143, 144: fixed electrode
14, 14A, 14B: resin surface
16, 116: rotary body
16A, 116A: central hole
16B: insert portion
17, 117: concavity-convexity portion
17A, 117A: convexity
17B, 117B: concavity
18, 74: variable electrode
18A, 53A, 54A, 58A, 74A, 112A, 113A, 141A, 142A, 143A: contact
18B, 58B: fixing portion
19, 119: holder
19A, 119A: cylinder
19B, 119B: flange
19C, 119C: button mounting portion
19D, 119D: swage hole
21, 114: elastic body
22: connecting electrode
23, 118: rotary manipulation knob
23A: insert groove
24: first connecting terminal
25, 121: pressing body
25A, 121A: pressing portion
31, 61, 71, 160: touch panel
31A, 71A: first base member
32, 32A, 32B, 33, 62A, 62B, 71B, 161, 162, 164: sensor electrode
41, 72, 170: cover panel
51, 115: wiring substrate
51A, 115A: contact pattern
51B: connection land
51C, 115C: insulating surface
58: second connecting terminal
75: upper casing
76: slide manipulation knob
112: first switch electrode
112B, 113B: contact portions
113: second switch electrode
120: click spring
120A: projection
130: resin portion
131, 132, 133, 134: hole
141B, 142B, 143B, 144B: hook portion
145: projection
146: engaging portion
161A, 162A, 164A: transmitter electrode 161B, 162B, 164B: receiver electrode
163: ground electrode
1000, 1001, 1002: rotary manipulation unit
1003: slide manipulation portion
2000, 2001, 2002, 2003: touch panel unit
3000, 3001, 3002, 3003: input device

The invention claimed is:

1. An input device comprising:
a projection; and
a concavity-convexity portion that contacts the projection,
wherein the concavity-convexity portion includes a plurality of concavities, each of which changes position with respect to the projection,
wherein the concavity-convexity portion includes a plurality of convexities, each of which changes position with respect to the projection,
each of the plurality of concavities and each of the plurality of convexities is arranged alternately with each other, and
wherein the input device further comprises:
a first electrode;
a second electrode which opposes the first electrode;
a third electrode in contact with or spaced apart from the second electrode; and
a contact electrically connected to the second electrode and in contact with the third electrode; and
an insulating surface in contact with the contact, wherein:
when the projection is positioned at one of the plurality of concavities, the third electrode is spaced apart from the second electrode,
when the projection is positioned at one of the plurality of convexities, the third electrode is in contact with the second electrode,
second electrode is fixed with respect to the first electrode,
the contact is movable on the third electrode and the insulating surface,
when the projection is positioned at the one of the plurality of concavities, the contact is in contact with the insulating surface, and
when the projection is positioned at the one of the plurality of convexities, the contact is in contact with the third electrode.

2. The input device according to claim 1, further comprising:
a click spring including the projection,
wherein the click spring generates clicking when the projection moves from one of the plurality of convexities to one of the plurality of concavities adjacent to the one of the plurality of convexities.

3. The input device according to claim 1, comprising:
a plurality of insulating surfaces; and
a plurality of third electrodes; wherein:
the insulating surface is one of the plurality of insulating surfaces,
the third electrode is one of the plurality of third electrodes, and
each of the plurality of insulating surfaces and each of the plurality of third electrodes is arranged alternately with each other.

4. The input device according to claim 1, wherein:
the projection is movable along the concavity-convexity portion,
in a first state where the projection is positioned on one of the plurality of convexities, the second electrode and the third electrode are electrically connected to each other, and
in a second state where the projection is positioned on one of the plurality of concavities, the second electrode and third electrode are electrically disconnected from each other.

5. The input device according to claim 4, further comprising:
a manipulation knob for applying an operation force and alternately switching between the first state and the second state,
wherein, when the operation force is removed while in the first state, the first state is switched to the second state.

6. An input device comprising:
a projection; and
a concavity-convexity portion that contacts the projection, wherein:
the concavity-convexity portion includes a plurality of concavities, each of which changes position with respect to the projection,
the concavity-convexity portion includes a plurality of convexities, each of which changes position with respect to the projection,
each of the plurality of concavities and each of the plurality of convexities is arranged alternately with each other,
the input device further comprises:
a first electrode;
a second electrode which opposes the first electrode;
a third electrode in contact with or spaced apart from the second electrode;
a contact electrically connected to the third electrode and in contact with the second electrode; and
an insulating surface in contact with the contact,
when the projection is positioned at one of the plurality of concavities, the third electrode is spaced apart from the second electrode,
when the projection is positioned at one of the plurality of convexities, the third electrode is in contact with the second electrode,
the second electrode is fixed with respect to the first electrode,
the contact is movable on the second electrode and the insulating surface,
when the projection is positioned at the one of the plurality of concavities, the contact is in contact with the insulating surface, and
when the projection is positioned at the one of the plurality of convexities, the contact is in contact with the second electrode.

7. The input device according to claim 6, comprising:
a plurality of insulating surfaces; and
a plurality of second electrodes, wherein:
the insulating surface is one of the plurality of insulating surfaces,
the second electrode is one of the plurality of second electrodes,
each of the plurality of insulating surfaces and each of the plurality of second electrodes is arranged alternately with each other.

8. The input device according to claim 6, further comprising:
a click spring including the projection,
wherein the click spring generates clicking when the projection moves from one of the plurality of convexities to one of the plurality of concavities adjacent to the one of the plurality of convexities.

9. The input device according to claim 6, wherein:
the projection is movable along the concavity-convexity portion,
in a first state where the projection is positioned on one of the plurality of convexities, the second electrode and the third electrode are electrically connected to each other, and
in a second state where the projection is positioned on one of the plurality of concavities, the second electrode and third electrode are electrically disconnected from each other.

10. The input device according to claim 9, further comprising:
a manipulation knob for applying an operation force and alternately switching between the first state and the second state,
wherein, when the operation force is removed while in the first state, the first state is switched to the second state.

11. An input device comprising:
a projection;
a concavity-convexity portion that contacts the projection;
a first electrode;
a second electrode which opposes the first electrode; and
a third electrode in contact with or spaced apart from the second electrode, wherein:
the concavity-convexity portion includes a plurality of concavities, each of which changes position with respect to the projection,
the concavity-convexity portion includes a plurality of convexities, each of which changes position with respect to the projection,
each of the plurality of concavities and each of the plurality of convexities is arranged alternately with each other,
when the projection is positioned at one of the plurality of concavities, the third electrode is spaced apart from the second electrode,
when the projection is positioned at one of the plurality of convexities, the third electrode is in contact with the second electrode,
the first electrode includes a receiver electrode opposing the second electrode, and a transmitter electrode opposing the receiver electrode, and
a capacitance between the receiver electrode and the transmitter electrode when the projection is positioned at the one of the plurality of convexities is larger than a capacitance between the receiver electrode and the transmitter electrode when the projection is positioned at the one of the plurality of concavities.

12. An input device comprising:
a projection;
a concavity-convexity portion that contacts the projection;
a first electrode;
a second electrode which opposes the first electrode; and
a third electrode in contact with or spaced apart from the second electrode, wherein:
the concavity-convexity portion includes a plurality of concavities, each of which changes position with respect to the projection,
the concavity-convexity portion includes a plurality of convexities, each of which changes position with respect to the projection,
each of the plurality of concavities and each of the plurality of convexities is arranged alternately with each other,
when the projection is positioned at one of the plurality of concavities, the third electrode is spaced apart from the second electrode,
when the projection is positioned at one of the plurality of convexities, the third electrode is in contact with the second electrode, and
the first electrode includes a receiver electrode which is annular and opposes the second electrode, and a transmitter electrode opposing the second electrode across the receiver electrode.

13. A manipulation unit to be arranged at a position overlapping a touch panel, comprising:
a plurality of concavities including a first concavity and a second concavity located next to the first concavity;
a projection configured to contact the plurality of concavities;
a fixed electrode; and
a variable electrode which is movable relative to the fixed electrode,
wherein the fixed electrode and the variable electrode are electrically disconnected from each other when the projection is positioned at the first concavity or at the second concavity,
the fixed electrode and the variable electrode are electrically connected to each other when the projection is positioned between the first concavity and the second concavity, and
the fixed electrode is configured to be capacitive-coupled with the second electrode.

14. The manipulation unit according to claim 13, wherein:
the manipulation unit receives an operation force, and
in case where the projection is positioned between the first concavity and the second concavity, when the operation force is removed, the projection automatically moves into the first concavity or the second concavity.

15. An input device comprising:
a projection;
a concavity-convexity portion that contacts the projection;
a first electrode;
a second electrode which opposes the first electrode; and
a third electrode in contact with or spaced apart from the second electrode, wherein:
the concavity-convexity portion includes a plurality of concavities, each of which changes position with respect to the projection,
the concavity-convexity portion includes a plurality of convexities, each of which changes position with respect to the projection,
each of the plurality of concavities and each of the plurality of convexities is arranged alternately with each other,
when the projection is positioned at one of the plurality of concavities, the third electrode is spaced apart from the second electrode,
when the projection is positioned at one of the plurality of convexities, the third electrode is in contact with the second electrode, and
the first electrode is capacitive-coupled with the second electrode.

* * * * *